United States Patent
Hofbauer et al.

(10) Patent No.: US 7,578,267 B2
(45) Date of Patent: Aug. 25, 2009

(54) INTERNAL COMBUSTION ENGINE

(75) Inventors: Peter Hofbauer, West Bloomfield, MI (US); Adrian Tusinean, Windsor (CA)

(73) Assignee: Advanced Propulsion Technologies, Inc., Goleta, CA (US)

( * ) Notice: Subject to any disclaimer, the term of this patent is extended or adjusted under 35 U.S.C. 154(b) by 0 days.

(21) Appl. No.: 12/203,809

(22) Filed: Sep. 3, 2008

(65) Prior Publication Data

US 2009/0139476 A1  Jun. 4, 2009

Related U.S. Application Data

(63) Continuation of application No. 10/560,648, filed as application No. PCT/US2004/020590 on Jun. 25, 2004, now Pat. No. 7,469,664.

(60) Provisional application No. 60/482,772, filed on Jun. 25, 2003.

(51) Int. Cl.
*F01B 7/12* (2006.01)
*F01B 15/02* (2006.01)
*F02B 25/08* (2006.01)
*F02B 75/22* (2006.01)

(52) U.S. Cl. .............. 123/51 BC; 123/51 BD; 123/50 B; 123/55.7

(58) Field of Classification Search .......... 123/42, 123/50 R, 50 A, 50 B, 51 R–51 BD, 54.1, 123/55.2–55.7, 71 R–71 VA
See application file for complete search history.

(56) References Cited

U.S. PATENT DOCUMENTS

| | | | | |
|---|---|---|---|---|
| 1,662,854 A | * | 3/1928 | Freislinger | 123/55.5 |
| 1,684,293 A | * | 9/1928 | Allan | 123/55.6 |
| 2,510,127 A | | 6/1950 | Mercier | |
| 6,170,443 B1 | | 1/2001 | Hofbauer | |

FOREIGN PATENT DOCUMENTS

| | | |
|---|---|---|
| DE | 3315052 A1 | 10/1984 |
| DE | 3508726 A1 | 9/1986 |
| DE | 4135386 A1 | 3/1992 |
| DE | 19503444 C1 | 5/1996 |
| DE | 19509725 A1 | 9/1996 |

(Continued)

OTHER PUBLICATIONS

Supplemental European Search Report dated Apr. 6, 2009 for related European patent application No. EP04756195; 4 pages total, cited references listed separately.

(Continued)

*Primary Examiner*—Noah Kamen
(74) *Attorney, Agent, or Firm*—Ganz Law, P.C.

(57) ABSTRACT

A two-stroke internal combustion engine is disclosed having opposed cylinders, each cylinder having a pair of opposed pistons, with all the pistons connected to a common central crankshaft. The inboard pistons of each cylinder are connected to the crankshaft with pushrods and the outboard pistons are connected to the crankshaft with pullrods. Each opposed cylinder further comprises an integrated scavenge pump for providing positive intake pressure. This configuration results in a compact engine with a very low profile, in which the free mass forces can be substantially balanced. The engine configuration also allows for asymmetrical timing of the intake and exhaust ports through angular positioning of the journals on the crankshaft.

23 Claims, 23 Drawing Sheets

FOREIGN PATENT DOCUMENTS

| | | |
|---|---|---|
| DE | 20017773 | 1/2001 |
| GB | 116162 A | 6/1918 |
| GB | 415454 A | 8/1934 |
| GB | 448073 A1 | 6/1936 |
| GB | 531009 A | 12/1940 |
| JP | 2001132402 A | 5/2001 |

OTHER PUBLICATIONS

Supplemental European Search Report dated Apr. 6, 2009 for related European patent application No. EP03718016; 5 pages total, cited references listed separately.

* cited by examiner

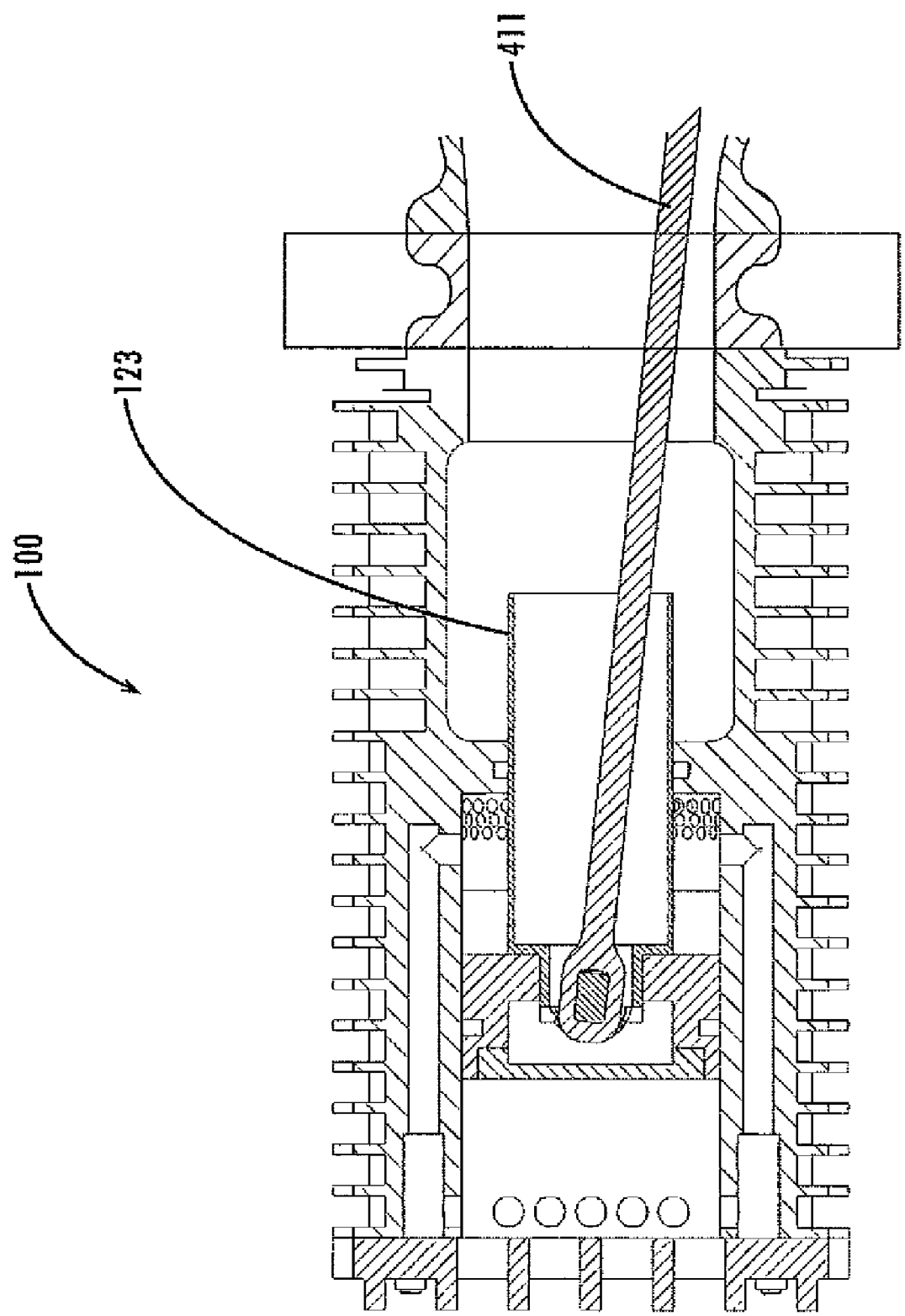

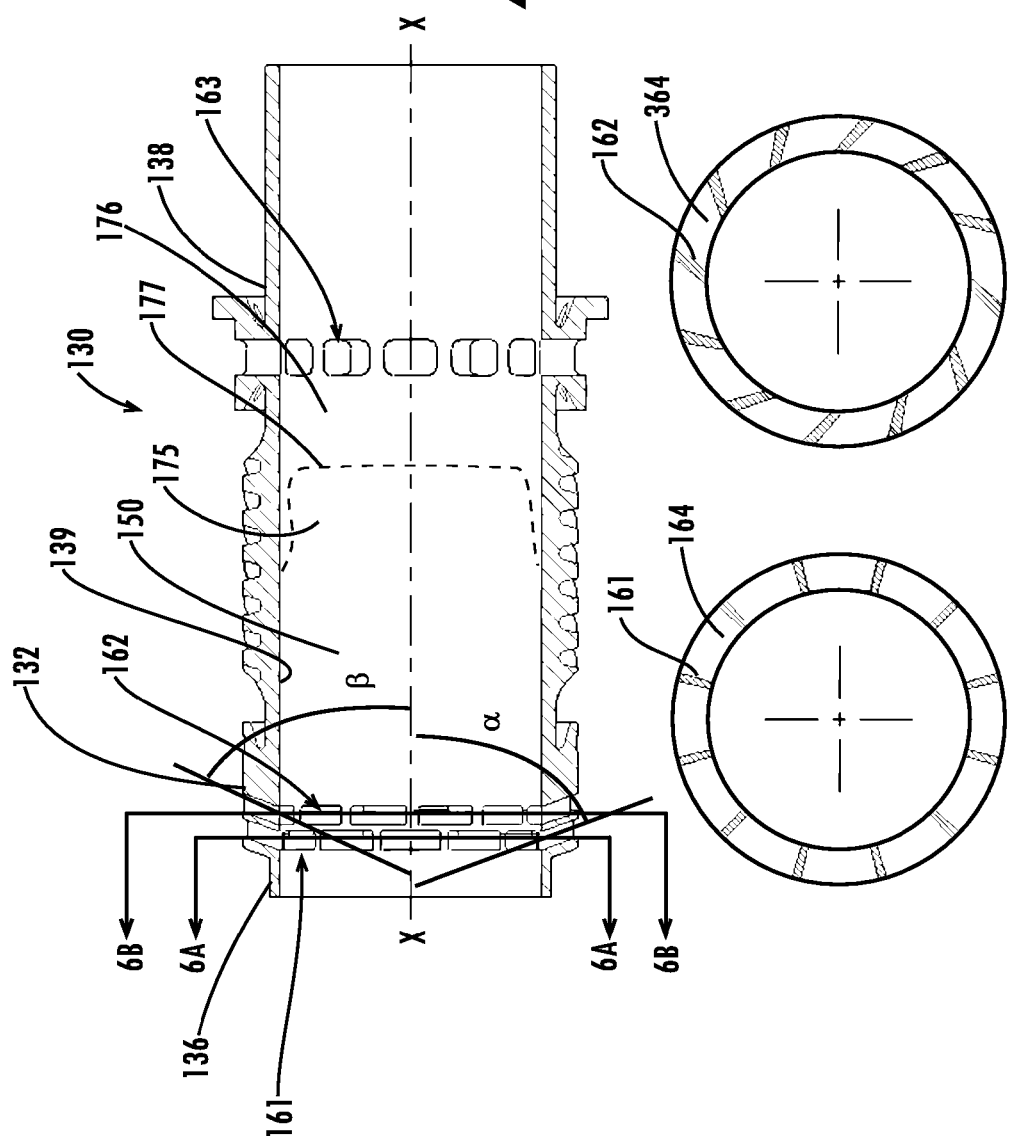

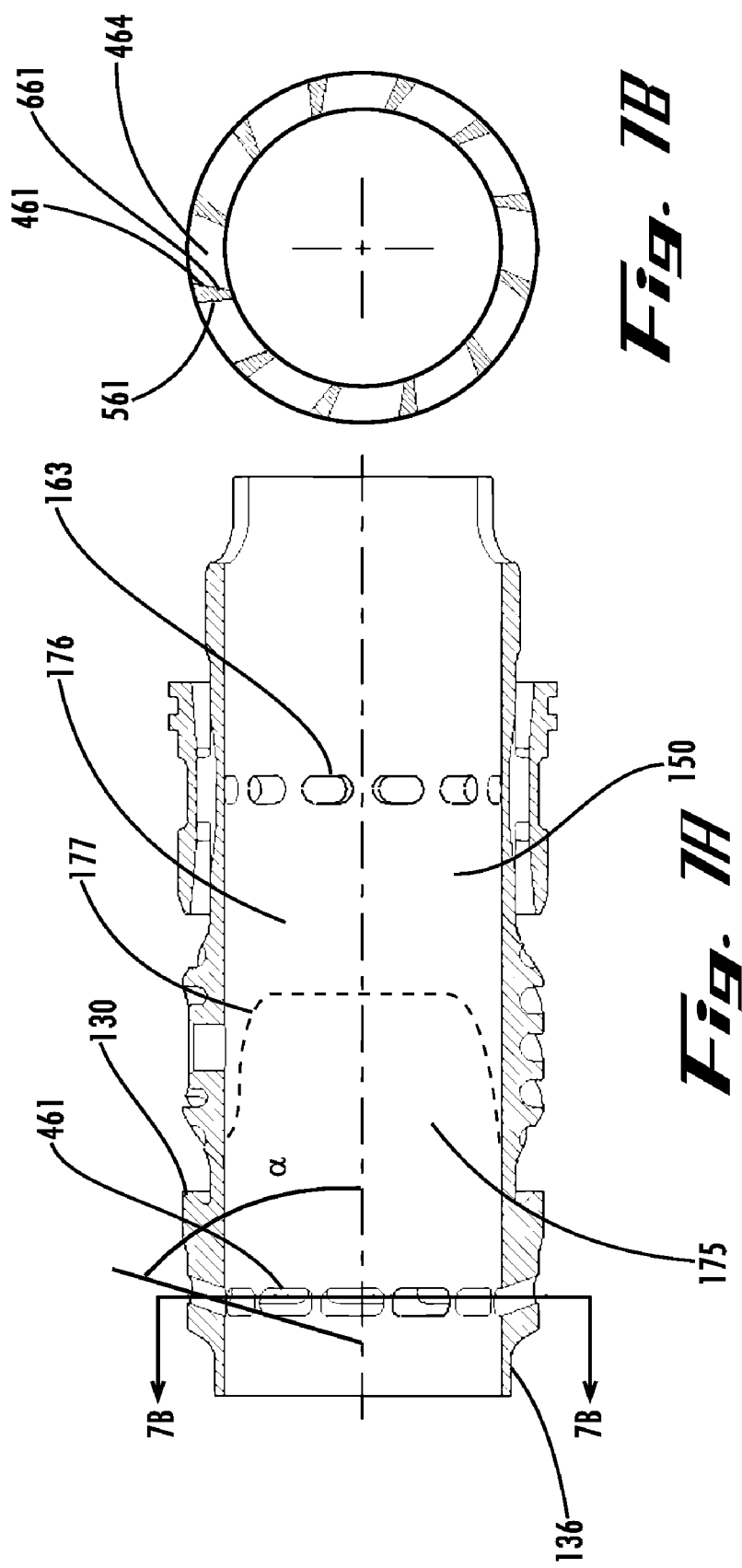

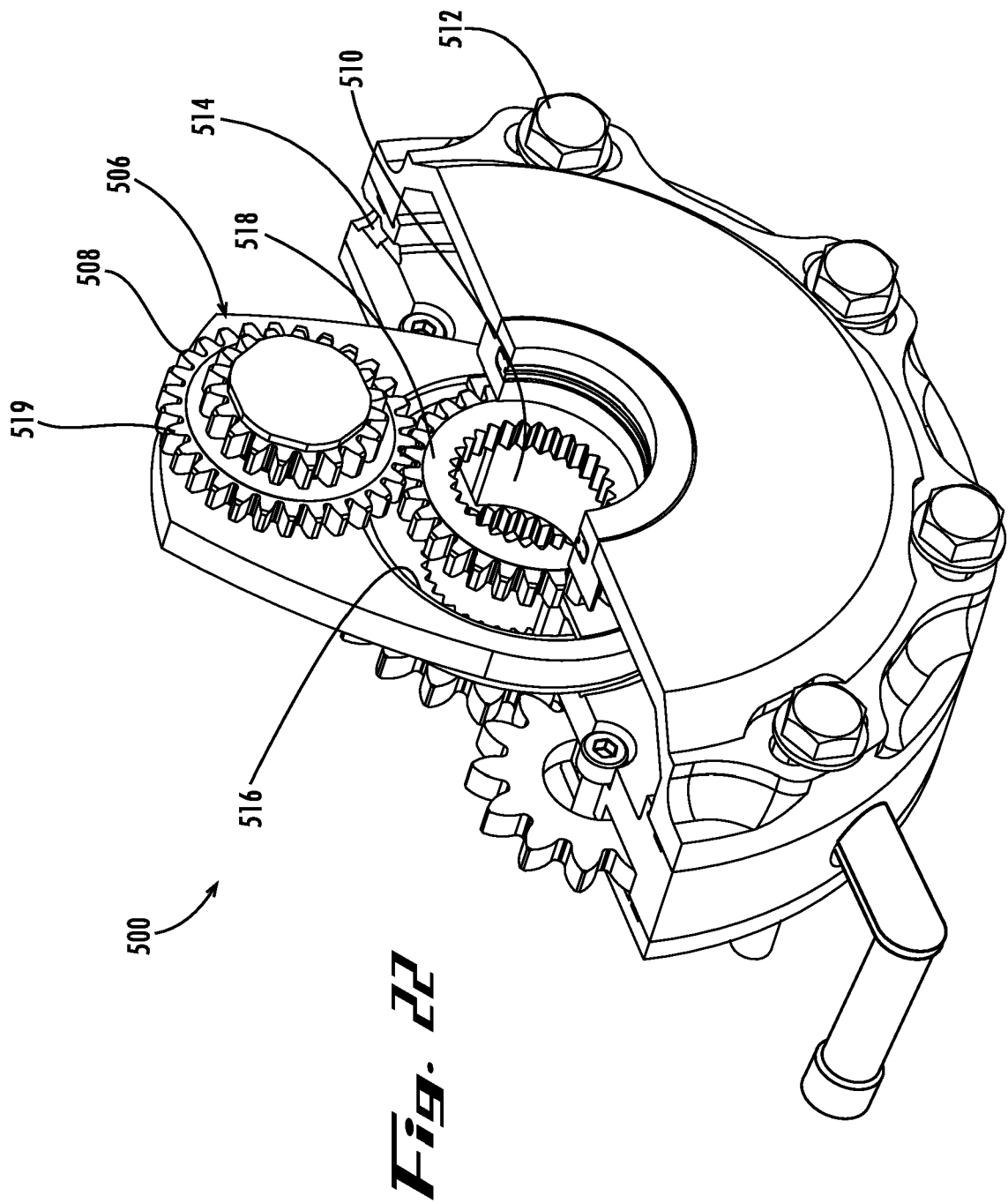

INTERNAL COMBUSTION ENGINE

RELATED APPLICATION

This application is a continuation of U.S. patent application Ser. No. 10/560,648, now U.S. Pat. No. 7,469,664, filed Dec. 13, 2005, which was submitted under 35 U.S.C. 371 as a U.S. National Phase application of International Patent Application Number PCT/US04/20590, filed Jun. 25, 2004, which claims priority from U.S. Provisional Patent Application No. 60/482,772, filed Jun. 25, 2003, the contents of which are hereby incorporated by reference as if recited in full herein for all purposes.

BACKGROUND

The present invention relates generally to two-stroke internal combustion engines, and more specifically to a two-stroke internal combustion engine having a pair of opposed cylinders, each cylinder having a pair of opposed pistons.

The design and production of internal combustion engines for the automotive and light aircraft industries are well-developed fields of technology. To be commercially viable, any new engine configuration must, without sacrificing performance, provide significant improvements in the areas of energy and raw material conservation (especially the improvement of fuel consumption), environmental protection and pollution control, passenger safety and comfort, and competitive design and production methods that reduce cost and weight. An improvement in one of these areas at the expense of any other is commercially unacceptable.

A new engine configuration must be mechanically simple so that mechanical losses are inherently minimized, and must be well-suited to maximizing combustion efficiencies and reducing raw emissions. In particular, a new engine configuration should specifically address the most significant sources of friction in internal combustion engines to reduce mechanical losses; should have combustion chambers of a volume and design suitable for optimum combustion efficiency; and should be adaptable to utilizing advanced supercharging and fuel injection techniques.

A new engine configuration should be lighter in weight and preferably have a reduced height profile for improved installation suitability and passenger safety. For automotive applications, a reduced height profile would permit the engine to fit under the seat or floor area. For light aircraft applications, a short profile would permit installation of the engine directly within the wing, without the need for an engine cowling.

A new engine configuration should be dynamically balanced so as to minimize noise and vibration. Ideally, the smallest practical implementation of the engine, such as a two-cylinder version, should be fully balanced; larger engines could then be constructed by coupling smaller engines together. At low-load conditions, entire portions of the engine (and their associated mechanical losses) could then be decoupled without unbalancing the engine.

Despite the promise of external continuous combustion technologies such as Stirling engines or fuel cells with electric motors to eventually provide low-emission high-efficiency engines for automobiles and light aircraft, these technologies will not be viable alternatives to internal combustion engines in the foreseeable future due to their inherent disadvantages in weight, space, drivability, energy density and cost. The internal combustion piston engine will for many years continue to be the principal powerplant for these applications.

The four-stroke internal combustion engine currently predominates in the automotive market, with the four cylinder in-line configuration being common. The need for at least four cylinders to achieve a suitable rate of power stroke production dictates the size and shape of this engine, and therefore also greatly limits the designers' options on how the engine is placed within the vehicle. The small cylinders of these engines are typically not optimal for efficient combustion or the reduction of raw emissions. The four cylinder in-line configuration also has drawbacks with respect to passenger comfort, since there are significant unbalanced free-mass forces which result in high noise and vibration levels.

It has long been recognized by engine designers that two-stroke engines have a significant potential advantage over four-stroke engines in that each cylinder produces a power stroke during every crankshaft rotation, which should allow for an engine with half the number of cylinders when compared to a four-stroke engine having the same rate of power stroke production. Fewer cylinders would result in an engine less mechanically complex and less bulky. Two-stroke engines are also inherently less mechanically complex than four-stroke engines, in that the mechanisms for opening and closing intake and exhaust ports can be much simpler.

Two-stroke engines, however, have seen limited use because of several perceived drawbacks. Two-stroke engines have a disadvantage in mean effective pressure (i.e., poorer volumetric efficiency) over four-stroke engines because a significant portion of each stroke must be used for the removal of the combustion products of the preceding power stroke (scavenging) and the replenishment of the combustion air, and is therefore lost from the power stroke. Scavenging is also inherently problematic, particularly when the engine must operate over a wide range of speeds and load conditions. Two-stroke compression-ignition (Diesel) engines are known to have other drawbacks as well, including poor starting characteristics and high particulate emissions.

Modern supercharging and fuel injection methods can overcome many of the limitations previously associated with two-stroke engines, making a two cylinder two-stroke engine a viable alternative to a four cylinder four-stroke engine. A two cylinder two-stroke engine has the same ignition frequency as a four cylinder four-stroke engine. If the two-stroke engine provides a mean effective pressure ⅔rds that of the four-stroke, and the effective displacement volume of each cylinder of the two-stroke is increased to 3/2 that of the four-stroke, then the two engines should produce comparable power output The fewer but larger combustion chambers of the two-stroke would be a better configuration for improvement of combustion efficiency and reduction of raw emissions; the two-stroke could also dispense with the valves of the four-stroke engine, thus permitting greater flexibility in combustion chamber design.

Current production engines are also known to have significant sources of friction loss; increased engine efficiency can be achieved by reducing these friction losses. The largest sources of friction loss in current production automotive engines, accounting for approximately half of all friction losses, are the result of the lateral forces produced by the rotating connecting rods acting on the pistons, pushing them against the cylinder walls. The magnitudes of these losses are a function of the crankshaft throw, r, divided by the connecting rod length, l; the ratio is often designated $\lambda$ (lambda). Decreasing $\lambda$, either by increasing the effective connecting rod length or decreasing the crankshaft throw, potentially yields the greatest overall reduction in friction loss.

The losses due to the contact of the pistons (or more correctly, the piston rings) with the cylinder walls are also a function of the mean velocity of the pistons with respect to the cylinder walls. If the pistons can be slowed down while maintaining the same power output, friction losses will be reduced.

Another significant source of friction loss in current production engines are the large forces acting on the crankshaft main bearings. A typical four cylinder inline engine has five crankshaft main bearings, which are necessary because there are literally tons of combustion force pushing down on the crankshaft; these forces must be transferred to the supporting structure of the engine. Both the crankshaft and the supporting structure of the engine must be designed with sufficient strength (and the corresponding weight) to accommodate these loads.

SUMMARY

Embodiments of the present invention provide a two cylinder two-stroke internal combustion engine having improved efficiency, a reduced height profile and lower weight for improved installation suitability, substantially total dynamic balance, and mechanical simplicity for reduced production costs.

Accordingly, an engine mechanism is disclosed that utilizes a single crankshaft and two opposed cylinders with integrated scavenging pumps. Each cylinder contains opposed inner and outer pistons reciprocably disposed to form a combustion chamber between them. Pushrods are provided to drivingly couple the inner pistons to the crankshaft, and pullrods to drivingly couple the outer pistons to the crankshaft.

Further in accordance with the invention, the pushrods share a common crankshaft journal as well as both pair of respective pullrods each share a common journal for receiving the driving forces from the respective pullrods and pushrods. Each cylinder has air intake ports and exhaust ports formed near its respective ends, controlled by the respective inner and outer pistons.

In accordance with embodiments of the invention, the pullrod and pushrod journals for each cylinder are arranged asymmetrically so that the exhaust ports of the associated cylinder open before its air intake ports open, and close before its air intake ports close.

In accordance with embodiments of the invention, each inner piston on its end remote from the combustion chamber has a smooth end face that is convexly curved in a plane perpendicular to the longitudinal axis of the crankshaft. An associated pushrod has a concavely shaped outer end surface that slidingly engages the curved end face of the inner piston. This pushrod configuration serves to effectively lengthen the pushrods; thereby reducing friction losses and improving dynamic balance.

In accordance with embodiments of the invention, two pullrods for each cylinder are provided for receiving the driving force from the outer pistons. The two pullrods are on opposite sides of the cylinder, with their inner ends encircling an associated journal of the crankshaft, while their ends remote from the crankshaft are coupled to a bridge that is pivotally coupled to the remote end of the respectively associated outer piston.

Maximum power efficiency from an engine according to the present invention is best achieved by applying pressurized air to the intake ports of each cylinder. In accordance with embodiments of the invention, an engine with asymmetric timing includes two scavenging pumps, each of which are integrated in the respective left and right cylinders and driven by respective outer pistons, are coupled to intake ports of an associated cylinder to apply pressurized intake fluid to the intake ports of that associated cylinder.

BRIEF DESCRIPTION OF THE DRAWINGS

The invention is further described in connection with the accompanying drawings, in which:

FIGS. 2 and 3 are top cross-sectional views of the left cylinder in the top dead center and bottom dead center positions, respectively, in accordance with an embodiment of the present invention;

FIG. 4 is a cross-sectional side view of the left cylinder, in accordance with an embodiment of the present invention;

FIG. 5 is a side cross-sectional view of a left cylinder liner that defines in-part the left combustion chamber, in accordance with an embodiment of the present invention;

FIG. 6A is a cross-sectional view along the cut line 6A-6A of FIG. 5;

FIG. 6B is a cross-sectional view along the cut line 6B-6B of FIG. 5;

FIG. 7A is a side and cross-sectional view of a left cylinder liner that defines in-part the left combustion chamber and at least one row of combination-intake ports at an intake end, in accordance with an embodiment of the present invention;

FIG. 7B is a cross-sectional view along the cut line 7B-7B of FIG. 7A;

FIG. 23 is a cross sectional view along the cut line 23-23 of FIG. 3 showing the left bridge comprising a bridge concave surface that is adapted to be slidingly received in convex pull surface of the right outer piston in accordance with an embodiment of the present invention;

DETAILED DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 1:
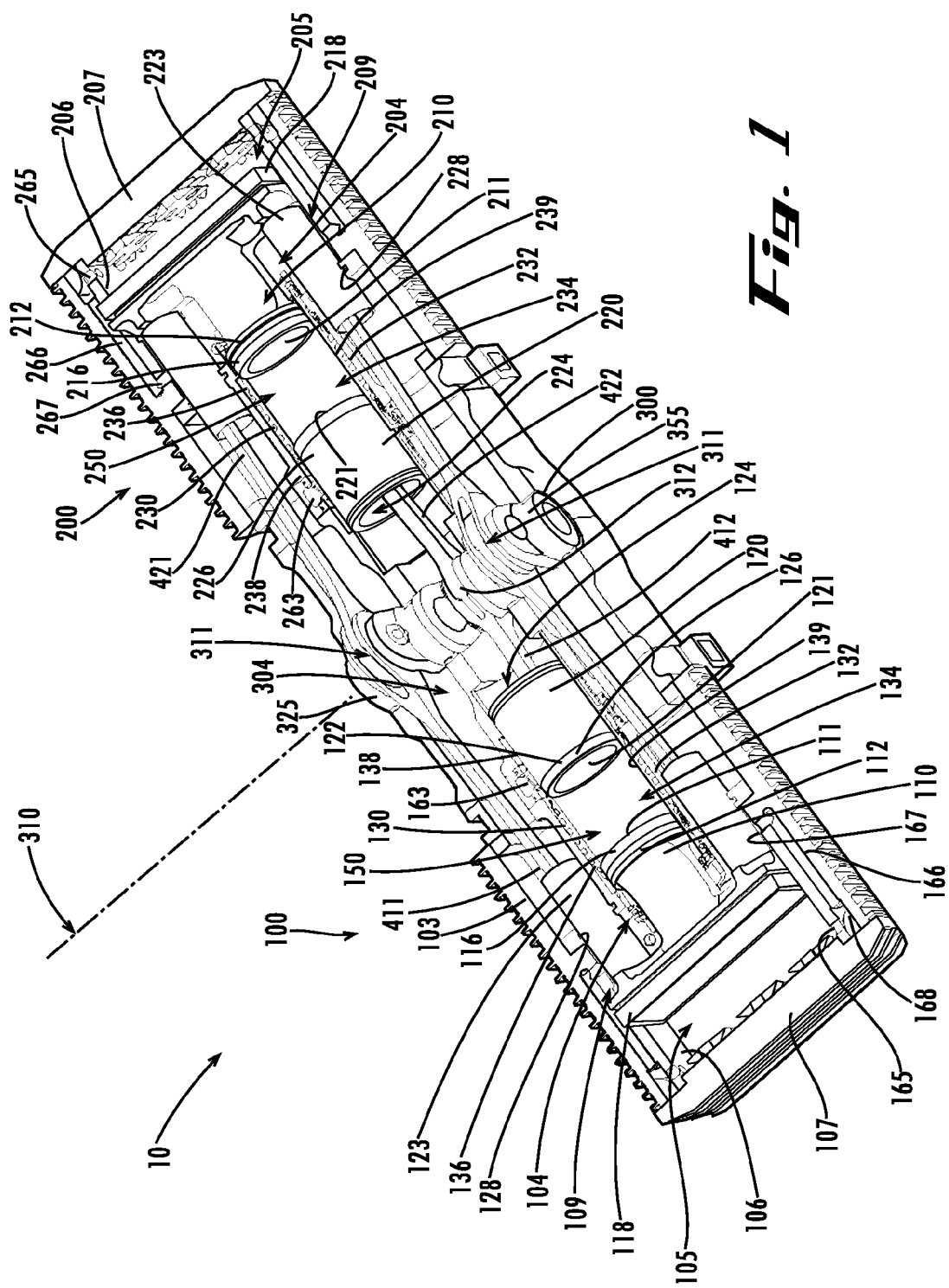
FIG. 1 is a partial cutaway isometric view of an engine in accordance with an embodiment of the present invention.
Figure 1:
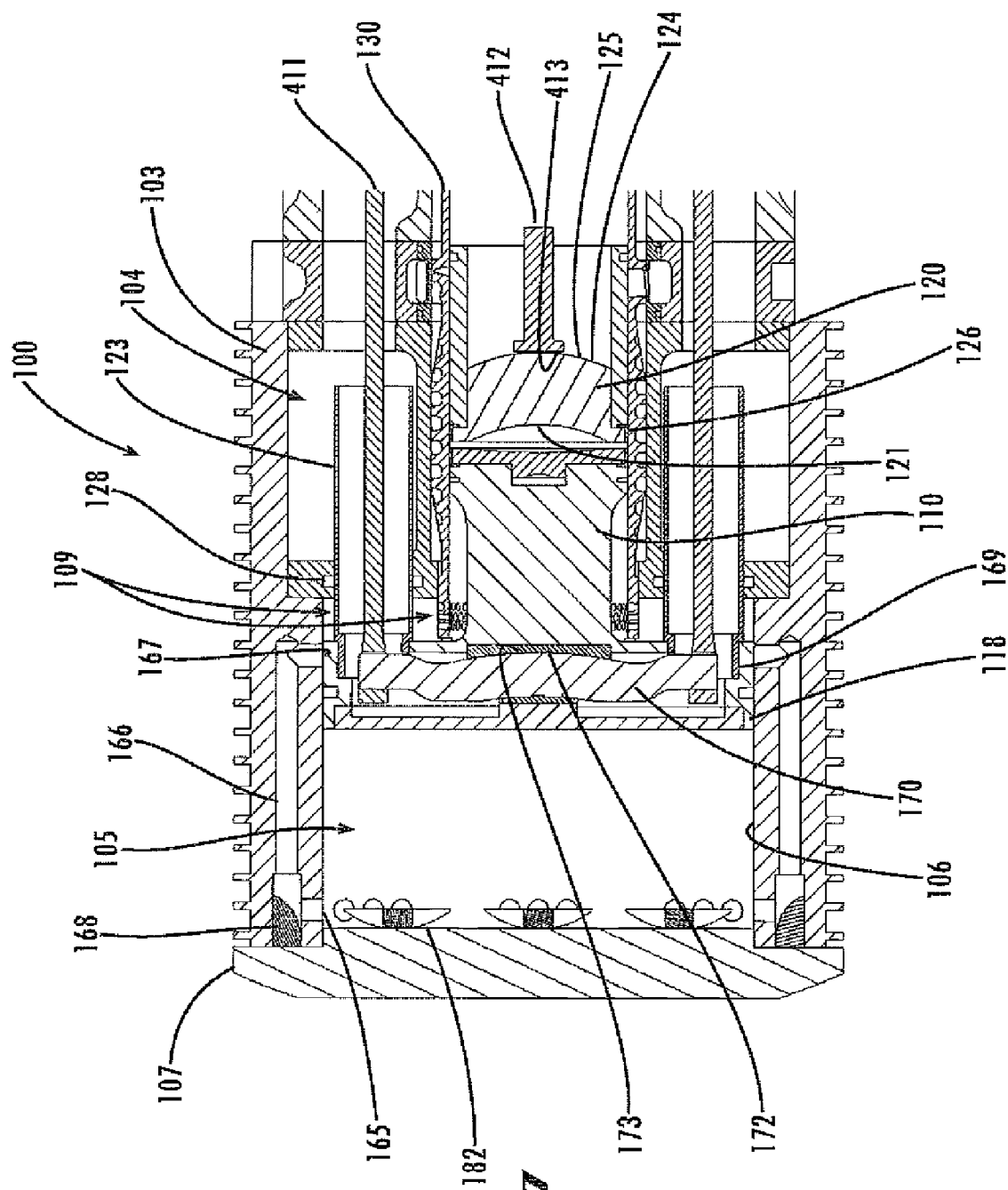
Figure 1:
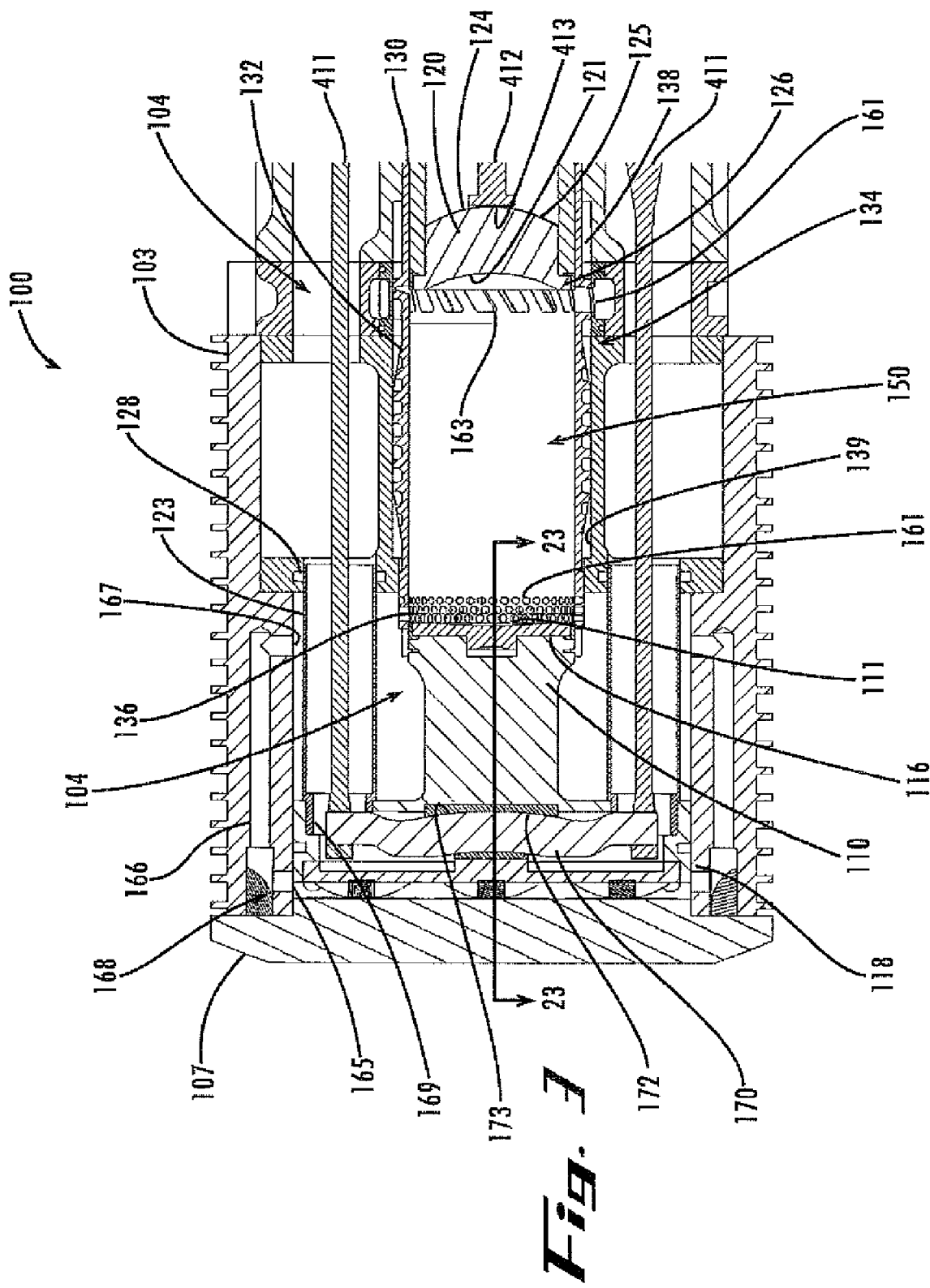

FIG. 1 is a partial cutaway isometric view of an engine 10 in accordance with an embodiment of the present invention. The engine 10 comprises a housing 103 containing a left cylinder 100, an axially aligned right cylinder 200 opposite the left cylinder 100, and a crankshaft 300 located there between. FIG. 1 depicts the engine 10 at a crankshaft angle of 0° or top dead center (TDC).

FIGS. 2 and 3 are top cross-sectional views of the left cylinder 100 in the DC and bottom dead center (BDC) positions, respectively, in accordance with an embodiment of the present invention. As shown in FIGS. 1, 2 and 3, the left cylinder 100 comprises a left cylinder liner 130, a left outer piston 110 and a left inner piston 120. The left cylinder liner 130 comprises a left cylinder liner outer surface 132 and a bore defining a left cylinder liner bore surface 139. The left cylinder liner 130 further comprises a left cylinder liner intake end 136 and a left cylinder liner exhaust end 138. The left cylinder liner intake end 136 comprises a plurality of left intake ports 161 and the left cylinder liner exhaust end 138 comprises a plurality of left exhaust ports 163, which will be further described below.

The left outer piston 110 comprises a left outer piston head 116 and a left outer piston plunger 118 opposite the left outer piston head 116. The left outer piston head 116 terminates at a left outer piston combustion face 111. The left outer piston head 116 is adapted to be slidingly received in close fitting engagement with the left cylinder liner bore surface 139 at the left cylinder liner intake end 136.

The left inner piston 120 comprises a left inner piston head 126 and a left inner piston push end 124 opposite the left inner piston head 126. The left inner piston head 126 terminates at a left inner piston combustion face 121. The left inner piston head 126 is adapted to be slidingly received in close fitting engagement with the left cylinder liner bore surface 139 at the left cylinder liner exhaust end 138.

The left outer piston 110, the left inner piston 120, and the left cylinder liner 130 define a left combustion chamber 150.

Similarly, as shown in FIG. 1, the right cylinder 200 comprises a right cylinder liner 230, a right outer piston 210 and a right inner piston 220. The right cylinder liner 230 comprises a right cylinder liner outer surface 232 and a bore defining a right cylinder liner bore surface 239. The right cylinder liner 230 further comprises a right cylinder liner intake end 236 and a right cylinder liner exhaust end 238. The right cylinder liner intake end 236 comprises a plurality of right intake ports 261 and the right cylinder liner exhaust end 238 comprises a plurality of right exhaust ports 263, which will be further described below.

The right outer piston 210 comprises a right outer piston head 216 and a right outer piston plunger 218 opposite the right outer piston head 216. The right outer piston head 216 terminates at a right outer piston combustion face 211. The right outer piston head 216 is adapted to be slidingly received in close fitting engagement with the right cylinder liner bore surface 239 at the right cylinder liner intake end 236.

The right inner piston 220 comprises a right inner piston head 226 and a right inner piston push end 224 opposite the right inner piston head 226. The right inner piston head 226 terminates at a right inner piston combustion face 221. The right inner piston head 226 is adapted to be slidingly received in close fitting engagement with the right cylinder liner bore surface 239 at the right cylinder liner exhaust end 238.

The right outer piston 210, the right inner piston 220, and the right cylinder liner 230 define a right combustion chamber 250.

The left outer piston 110 and the right outer piston 210 are coupled to a pair of common journals, outer piston journals 311, on the crankshaft 300. The left outer piston 110 is coupled to the crankshaft 300 by means of a pair of left pullrods 411, one on either side of the left cylinder liner 100. Similarly, the right outer piston 210 of the right cylinder 200 is coupled to the crankshaft 300 by two right pullrods 421. Since the pullrods 411, 421 are typically always in tension during normal engine operation and need only support a minor compressive force during engine startup, as will be further explained below, they may be relatively thin and therefore lightweight. The long length of the pullrods 411, 421 relative to the crankshaft throws serves to reduce friction losses in the engine 10. The pullrods 411, 421 and how they couple with the crankshaft 300 will be further described below.

The left and right pullrods 411, 421 are coupled to the left and right outer pistons 110, 210 by means of left and right bridges 170, 270. The left and right bridges 170, 270 comprise a bridge concave surface 173 that is adapted to be slidingly received in convex pull surface 172 of the left outer piston 110, which will be further described below.

The left inner piston 120 and the right inner piston 220 are coupled to a common journal, an inner piston journal 312, on the crankshaft 300. During normal engine operation, the left/right pushrods 412, 422 are always under compression. The left inner piston 120 of the left cylinder 100 is coupled to the crankshaft 300 by means of a left pushrod 412; the right inner piston 220 of the right cylinder 200 is similarly coupled to the crankshaft 300 by a right pushrod 422. The left/right pushrods 412, 422 have left/right concave ends 413, 423 that ride on left/right convex surfaces 125, 225 on the left/right inner piston push ends 124, 224 of the left/right inner pistons 120, 220, respectively. This arrangement serves to effectively lengthen the pushrod length, which reduces friction losses and helps dynamically balance the engine 10. The left/right pushrods 412, 422 and the left/right convex surfaces 125, 225 will be further described below.

The four pistons 110, 120, 210, and 220 have a plurality of piston rings 112, 122, 212, and 222, respectively, located both behind the combustion faces 111, 121, 211, 221 and further along the piston heads 116, 118, 216, 218 to prevent the escape of fluid from between the piston heads 116, 118, 216, 218 and the bore surface 115, 215. Additional piston rings may be employed.

As stated above, the left/right cylinder liners 130, 230 each have a plurality of left/right intake ports 161, 261 and left/right exhaust ports 163, 263. On the left cylinder 100, by way of example, the left outer piston 110 opens and closes the left intake ports 161 and the left inner piston 120 opens and closes the left exhaust ports 163. The timing of the opening and closing of the left/right intake ports 161, 261 and left/right exhaust ports 163, 263 will be described below.

The housing 103 is adapted to house the left cylinder 100, the right cylinder 200, and the crankshaft 300. The housing 103 comprises a left cylinder cavity 104, a right cylinder cavity 204, and a crankshaft cavity 304, adapted to house the left cylinder 100, the right cylinder 200, and the crankshaft 300, respectively. The left cylinder cavity 104 defines a left plunger sliding surface 106 and terminates with a left housing end cap 107. The left plunger 118 is adapted to be slidingly received in close fitting sealed engagement with the left plunger sliding surface 106. The left plunger 118, the left housing end cap 107, and the left plunger sliding surface 106 define a first left scavenging chamber 105.

The left cylinder cavity 104 is divided into two volumes by a pair of left sleeve seals 123: one defining in-part the crankshaft cavity 304 and the other defining a second left scavenging chamber 109. The left sleeve seals 123 are tubular members each having an inner bore diameter adapted so that one of the left pullrods 411 can pass therethrough.

FIG. 4 is a cross-sectional side view of the left cylinder 100, in accordance with an embodiment of the present invention. The left sleeve seals 123 comprise a suitable cross-sectional shape, such as circular or elliptical, so as to accommodate the range of motion of the left pullrods 411 during operation of the engine 10. As shown, the left pullrods 411 are in a lowered position wherein the crankshaft (not shown) is in the BDC position.

Referring again to FIGS. 1-3, a sleeve end 169 of the left sleeve seal 123 is coupled to the left plunger 118 such that the left sleeve seal 123 is carried by the left plunger 118 as the left plunger 118 translates axially during engine operation.

The left cylinder cavity 104, the left plunger 118, the left cylinder liner 130, and the left sleeve seals 123 define the second left scavenging chamber 109. The second left scavenging chamber 109 and the crankshaft cavity 304 are sealed from fluid communication by the engagement of each of the left sleeve seals 123 with left sleeve seal rings 128 coupled to the housing 103. The left sleeve seal rings 128 are adapted to allow the translation of the left sleeve seals 123 therein while preventing fluid communication between the second left scavenging chamber 109 and the crankshaft cavity 304.

In one embodiment in accordance with the present invention, intake fluid is communicated through the second left scavenging chamber 109 and lubricating and/or cooling fluid is communicated through the crankshaft cavity 304.

The first left scavenging chamber 105 is in fluid communication with the second left scavenging chamber 109 by at least one first scavenging chamber port 165, a left scavenging conduit 166, and a second scavenging chamber port 167. The first scavenging chamber port 165 provides fluid communication between the first left scavenging chamber 105 and the left scavenging conduit 166, and the second scavenging chamber port 167 provides fluid communication between the left scavenging conduit 166 and the second left scavenging chamber 109.

Similarly, the right cylinder cavity 204 defines a right plunger sliding surface 206 and terminates with a right housing end cap 207. The right plunger 207 is adapted to be slidingly received in close fitting engagement with the right plunger sliding surface 206. The right plunger 207, the right housing end cap 207, and the right plunger sliding surface 206 define a first right scavenging chamber 205.

In substantially similar arrangement as the left cylinder 100, the right cylinder cavity 204 is divided into two volumes by a pair of right sleeve seals 223: one defining in part the crankshaft cavity 304 and the other defining a second right scavenging chamber 209.

Scavenging Pump

The mechanical components that make up the first and second scavenging chambers 105, 205, 109, 209 are herein referred to as a scavenging pump. Scavenging pump operation will be described by way of example. Assume that the left cylinder 100 is undergoing a power stroke wherein the crankshaft 300 is at 90° past "top dead center" (TDC), such as shown in FIG. 2. During the power stroke, the left outer piston 110 and the left inner piston 210 are driven apart by the high pressure fluid within the left combustion chamber 150 produced during combustion. The left outer piston 110 and therefore the left outer piston plunger 118 is driven towards the left housing end cap 107, which in turn decreases the volume, and increases the pressure within the first left scavenging chamber 105, as shown in FIG. 3.

At a predetermined pressure; a one-way valve 168 adjacent the first scavenging chamber port 165, among other suitable locations, releases high-pressure fluid from the first left scavenging chamber 105 through the left scavenging conduit 166 and into the second left scavenging chamber 109. At a predetermined time during the high-pressure fluid release from the first left scavenging chamber 105, the left intake ports 161 are opened to permit the high pressure fluid in the second left scavenging chamber 109 to enter the left combustion chamber 150.

The intake fluid in the second left scavenging chamber 109 is further compressed by the movement of the left outer pistons 110. In accordance with an embodiment of the present invention, the left exhaust ports 163 are closed before the left intake ports 161, wherein the pressure of the intake fluid further increases as the left outer piston 110 moves distal to the crankshaft 300.

During the compression stroke, the left outer piston 110 and the left inner piston 210 are driven together by the left pullrods 411 and the left pushrods 412, respectively. The left outer piston 110 and therefore the left outer piston plunger 118 is driven away from the left housing end cap 107, which in turn increases the volume, and decreases the pressure within the first left scavenging chamber 105. This closes the one-way valve 168 adjacent the first scavenging chamber port 165 and opens one or more one-way intake valves 182 in the left housing end cap 107, drawing in intake fluid there through.

Intake Ports

FIG. 5 is a side cross-sectional view of a left cylinder liner 130 that defines in-part the left combustion chamber 150, in accordance with an embodiment of the present invention. The left cylinder liner 130 comprises a left cylinder liner intake end 136 comprising at least one row of first intake ports 161 and at least one row of second intake ports 162. The left cylinder liner 130 further comprises a left cylinder liner exhaust end 138 comprising at least one row of exhaust ports 163.

FIGS. 6A and 6B are cross-sectional views of the first and second intake ports 161, 162 respectively, in accordance with an embodiment of the present invention. Each of the first intake ports 161 comprise a radial flow channel 164 that is adapted to direct intake fluid into the left combustion chamber 150 in a radial direction with respect to the left cylinder liner axis X-X and at a retrograde angle alpha in a direction away from the exhaust end 138 and towards the intake controlling left outer piston 110, as shown in FIG. 3. The radial flow channels 164 are adapted to direct intake fluid into the central region of the left combustion chamber 150 and away from the left cylinder liner bore surface 139. Determination of a suitable retrograde angle alpha is dependent on the pressure of the intake fluid supplied to the first intake ports 161, the pressure within the left combustion chamber 150, intake fluid temperature, intake fluid velocity, intake fluid composition, among others. A central intake-fluid zone flow pattern is established by the first intake ports 161 characterized by a substantially-non-swirling fluid path.

Each of the second intake ports 162 comprise a tangential flow channel 364 that is adapted to direct intake fluid in a substantially tangential direction with respect to the left cylinder liner bore surface 139 and at a retrograde angle beta in a direction away from the exhaust end 138 and towards the intake controlling left outer piston 110, as shown in FIG. 3. The tangential flow channels 364 are adapted to direct intake fluid substantially along the left cylinder liner bore surface 139. The tangential flow channels 364 are adapted to establish a side intake-fluid zone adjacent the central intake-fluid zone and the left cylinder liner bore surface 139. Determination of a suitable retrograde angle beta is dependent on the pressure of the intake fluid supplying the second intake ports 163, pressure in the left combustion chamber 150, intake fluid temperature, intake fluid composition, among others. The flow pattern established by the second intake ports 163 is characterized by a substantially-swirling fluid path in the combustion chamber 150.

In operation of the OPOC engine 10, as the left outer piston 110 translates in a retrograde direction (away from the crank shaft), the second intake ports 162 open. The second intake ports 162 establish a back flow of the exhaust (combustion) fluid about the second intake ports 162 and later a swirl intake-fluid flow pattern that displaces the exhaust fluid that lies adjacent the left cylinder liner bore surface 139 because the centrifugal forces are pushing the heavier cold intake fluid away from the axis X-X. As the left outer piston 110 translates further in a retrograde direction, the first intake ports 161 are opened now in combination with the second intake ports 162. The first intake ports 161 establish a central flow pattern that displaces the exhaust fluid that is found in the central region of the left combustion chamber 150. This central flow is at the beginning not disturbed by the flow through the second intake ports 162 due to the back flow when the second intake ports 162 open.

The combination of the central intake-fluid zone flow pattern and the side intake-fluid zone adjacent the central intake-fluid zone and the left cylinder liner bore surface 139 provides a relatively flat slug or fluid front 177 between the intake fluid 175 and the exhaust fluid 176. When the fluid front 177 reaches the exhaust ports 163, the intake fluid 175 has substantially scavenged or displaced the exhaust fluid 176 from the left cylinder liner 130. 5 FIGS. 7A and 7B are a side and cross-sectional view of a left cylinder liner 130 that defines in-part the left combustion chamber 150 and at least one row of combination-intake ports 461 at an intake end 136, in accordance with an embodiment of the present invention. Each of the combination intake ports 461 comprise a combination flow channel 464 comprising a radial surface 561 and a generally tangential surface 661 that is adapted to direct intake fluid into the left combustion chamber 150 in both a radial and tangential direction with respect to the left cylinder liner axis X-X and at a retrograde angle gamma in a direction away from the exhaust end 138 and towards the intake controlling left outer piston 110, as shown in FIG. 3.

This combination intake port 461 is particularly advantageous in small engines where there is insufficient space to put in multiple rows of intake ports. A single row that has integrated both functions: directing the flow toward the center of the left combustion chamber 150 while providing the necessary swirl is provided.

FIG. 7A approximately illustrates the resulting flow pattern 117 in the left combustion chamber 150. In effect, a well formed front, or slug, of intake fluid 175 extends substantially the width of the left combustion chamber 150 and effectively displaces the exhaust fluid 176 from the combustion chamber 150 towards the exhaust ports 163. The combination of intake port geometry (height, width, length, radial, tangential, among others), inner and outer piston timing, intake fluid pressure and temperature, among others, provides that substantially all of the exhaust fluid 176 is displaced from the combustion chamber 150 during the exhaust phase. Also, the above parameters provide that substantially no potentially fuel-rich intake fluid 175 is permitted to escape the exhaust ports 163.

The mentioned flow pattern developed in the combustion chamber 150 provides increase in engine performance and a greatly reduced emission of fuel-rich pollutants.

Figure 8B:
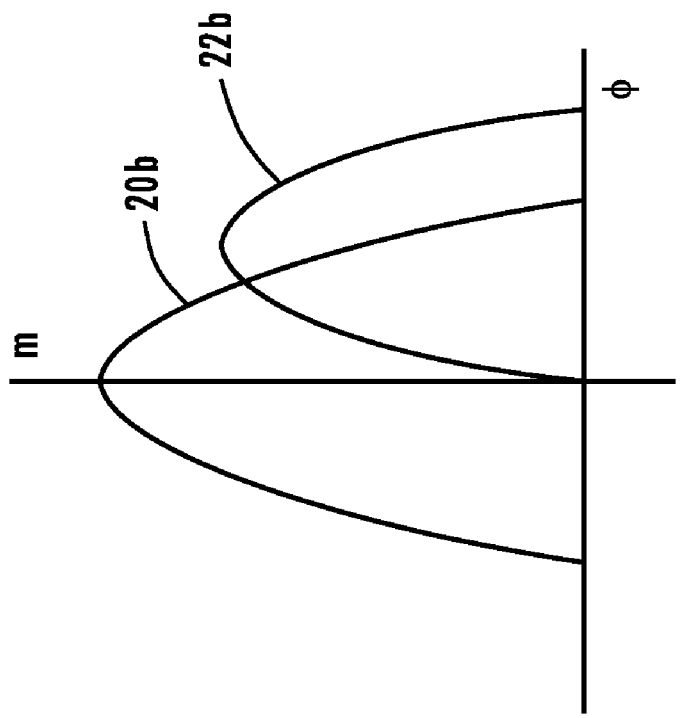
FIG. 8B is a graph representing asymmetric tiling of the opening and closing of the intake ports and the exhaust ports as a function of crankshaft angle in accordance with the present invention.
Figure 8A:
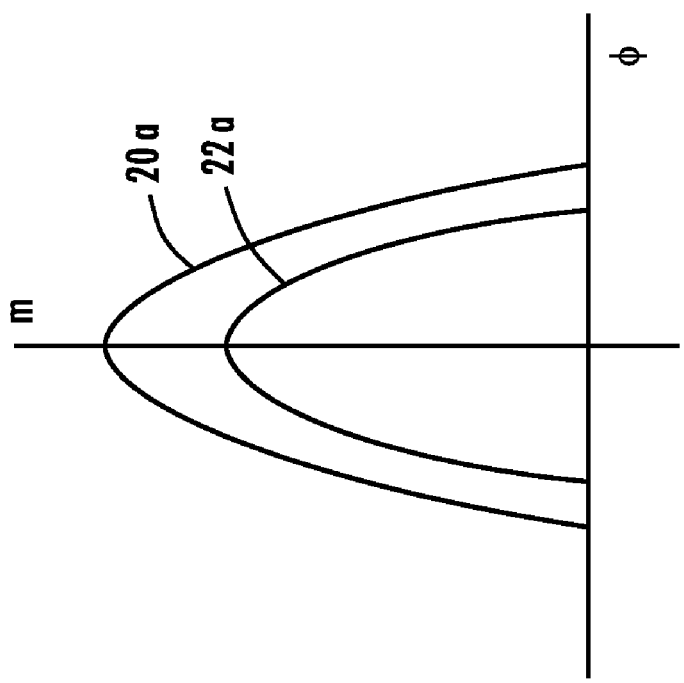
FIG. 8A is a graph representing symmetric timing of the opening and closing of the intake ports and the exhaust ports as a function of crankshaft angle.

FIG. 8A is a graph representing symmetric timing of the opening and closing of the intake ports and the exhaust ports as a function of crankshaft angle. An intake port curve 22a shows the opening and closing of the intake ports as a symmetric curve about the axis m. An exhaust port curve 20a shows the opening and closing of the exhaust ports as a symmetric curve about the axis m and about the intake port curve 22a. The exhaust port curve 20a shows that the exhaust ports open before the intake ports open, and the exhaust ports close after the intake ports close. This timing configuration is not ideal, as there will be a pressure loss out of the last-closing exhaust ports.

FIG. 8B is a graph representing asymmetric timing of the opening and closing of the intake ports and the exhaust ports as a function of crankshaft angle, in accordance with an embodiment of the present invention. An intake port curve 22b shows the opening and closing of the intake ports as a symmetric curve offset from the axis m. An exhaust port curve 20b shows the opening and closing of the exhaust ports as a symmetric curve about the axis m. The exhaust port curve 20b shows that the exhaust ports open before the intake ports open, and the exhaust ports close before the intake ports close. This timing configuration is suitable for maintaining or increasing pressure within the combustion chamber after the exhaust ports close with no loss out of the first-to-close exhaust ports.

One relationship of pistons and connecting rods, with associated timing sequences, is described in further detail in U.S. Pat. No. 6,170,443 and PCT/US 03/08708 entitled ENGINE WITH POWER GENERATING CAPABILITY, which is under common ownership with this application, and is incorporated herein by reference in its entirety for all purposes.

Other timing sequences are appreciated. In one embodiment, asymmetric timing may be desired to reduce the complexity of the system. Various timing sequences in accordance with embodiments of the present invention are described herein.

Referring again to FIG. 1, the outer piston journals 311 and the inner piston journal 312 are uniquely positioned with respect to the crankshaft rotational axis 310. The inner piston journal 312 is further from the crankshaft rotational axis than the outer piston journals 311, resulting in greater travel for the left/right inner pistons 120, 220 than for the left/right outer pistons 110, 210. Further, the inner piston journal 312, which directly controls the translation of the left/right inner pistons 120, 220 which open and close the left/right exhaust ports 163, 263 in the left/right cylinders 100, 200, are angularly advanced, while the outer piston journals 311 which directly control the translation of the left/right outer pistons 110, 210, which open and close the intake ports, such as the first and second intake ports 161, 162, are angularly retarded.

The above configuration provides an asymmetric timing that has the exhaust ports 161 opening before the intake ports 161, 162 and the exhaust ports 161 closing before the intake ports 161, 162 close. This arrangement provides that no intake fluid is permitted to exhaust through the exhaust ports 162, and for substantially complete scavenging of the combustion chamber 150.

Referring again to FIGS. 2 and 3, the left outer piston 110 selectively opens and closes the intake ports 261, 262, 461 to facilitate desired timing of the intake fluid into the left combustion chamber 150. An embodiment in accordance with the present invention comprises asymmetric timing wherein at the end of the firing or power stroke, before bottom dead center (BBDC) exhaust ports 163 open at approximately 75 degrees, measured as the amount of crankshaft rotation. And, the second intake ports 162 open at approximately 45 degrees. Conversely, at the beginning of the compression stroke, after bottom dead center (ABDC), the exhaust ports 163 close at approximately 45 degrees, and the second intake ports 162 close at approximately 55 degrees, for example.

Variable Port Timing

Figure 9:
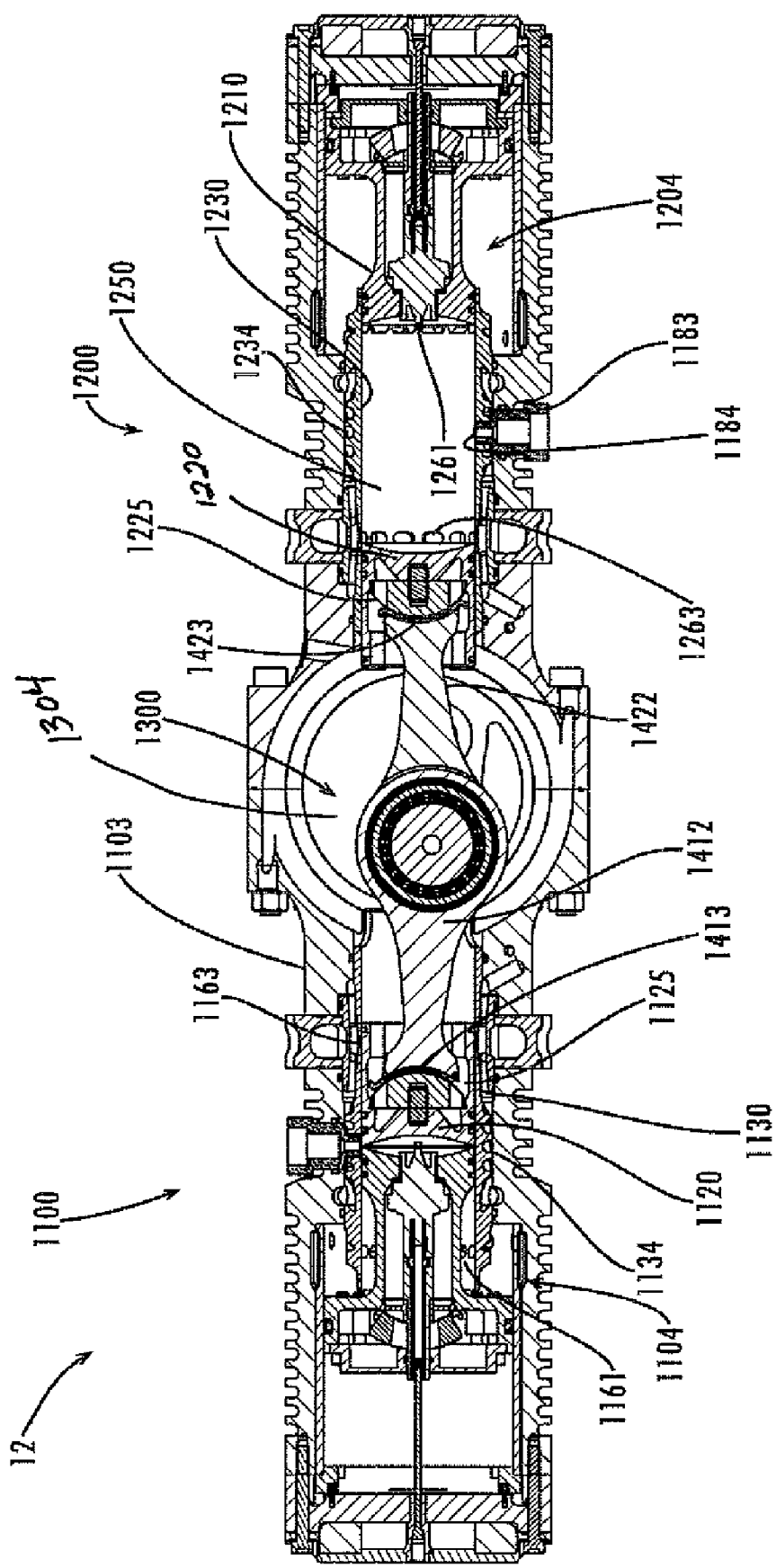
FIG. 9 is a side cross-sectional view of an engine with the crankshaft at an angle of rotation of 270°, in accordance with an embodiment of the present invention.

FIG. 9 is a side cross-sectional view of an engine 12 with the crankshaft 1300 at an angle of rotation of 270°, in accordance with an embodiment of the present invention. At this angle, the left outer and inner pistons 1110, 1120 of the left cylinder 1100 are converged, with the left intake and left exhaust ports 1161, 1163 being closed. The intake fluid between the left outer and inner pistons 1110, 1120, is compressed there between.

The right cylinder 1200 is completing its power stroke, with the right outer and inner pistons 1210, 1220 having moved apart with the right intake and exhaust ports 1261, 1263 open.

The amount of time that the intake and exhaust ports 1161, 1261, 1163, 1263 are open to bring in intake (pre-combustion) fluid and blow out exhaust fluid, respectively, is determined by a number of fixed and variable factors. The fixed factors are, among others, the stroke length of the outer and inner pistons 1110, 1210, 1120, 1220 and the distance between the intake and exhaust ports 1161, 1261, 1163, 1263. The variable factors include, among other things, the engine speed and intake fluid pressure.

The opening and closing of the intake and exhaust ports 1161, 1261, 1163, 1263 is preferentially timed so as to allow a substantially complete blowout of exhaust fluid from the respective left/right combustion chamber 1150, 1250 by the incoming intake fluid, but not so long so as to allow intake fluid to exit the exhaust ports 1163, 1263. Insufficient blowout of exhaust fluid will reduce engine 12 performance. Escape of intake fluid out of the exhaust ports 1163, 1263 contributes to airborne pollution.

The time in which the intake and exhaust ports 1161, 1261, 1163, 1263 are open is directly related to engine speed, all else being constant. The intake and exhaust ports 1161, 1261, 1163, 1263 are open for a shorter period of time for a higher engine speed than that for a slower engine speed. For a constant intake fluid pressure, the amount of intake and exhaust fluid displacement is therefore directly related to engine speed. An ideal complete displacement of exhaust fluid by intake fluid is achievable for only one engine speed.

Sliding Cylinder Liner

Figure 11:
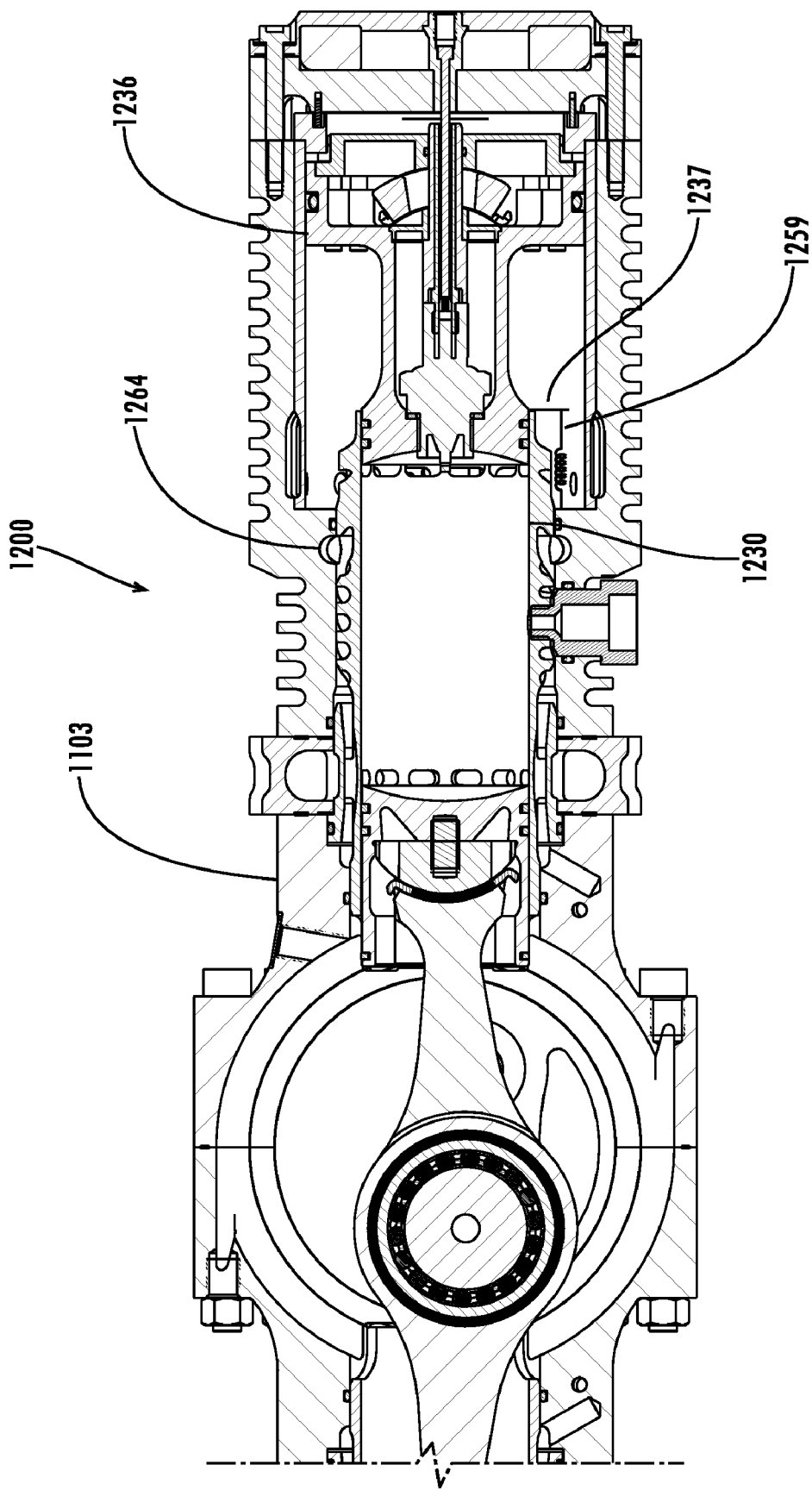
FIG. 11 is a side cross-sectional view of an engine with a sliding cylinder linear in accordance with an embodiment of the present invention.

Referring to FIGS. 9 and 11, which shows an engine with sliding cylinder liners, the portion of the reference numbers in the thousands number range indicate same or similar parts as the hundreds number range of reference numbers listed elsewhere in the specification. In an embodiment in accordance with the present invention, variable port timing is provided to adjust the time in which the intake and exhaust ports 1161, 1261, 1163, 1263 are open relative to engine speed. Referring again to FIG. 9, the housing 1103 comprises a left cylinder cavity 1104, a right cylinder cavity 1204, and a crankshaft cavity 1304, adapted to house the left cylinder 1100, the right cylinder 1200, and the crankshaft 1300, respectively. The left cylinder cavity 1104 defines a left cylinder liner bore 1134 adapted to slidingly receive in close fitting engagement with the left cylinder liner 1130. Suitable sliding seals (not shown) are provided between the left cylinder liner bore 1134 and the left cylinder liner 1130.

The axial location of the left cylinder liner 1130 relative to the left cylinder liner bore 1134 is preferentially controlled. During slow engine speed operation, the left cylinder liner 1130 is translated axially towards the crankshaft 1300. The movement of the left cylinder liner 1130 towards the crankshaft 1300 effectively shortens the time in which the left exhaust ports 1163 are open. In an extreme example, the left cylinder liner 1130 moves an axial distance towards the crankshaft 1300 sufficient so that the left inner piston 1120 only partially opens the left exhaust ports 1163 further reducing the time in which the exhaust fluid exits the left exhaust ports 1163.

Similarly, the axial location of the right cylinder liner 1230 relative to the right cylinder liner bore 1234 is preferentially controlled. During slow engine speed operation, the right cylinder liner 1230 is translated axially towards the crankshaft 1300. The movement of the right cylinder liner 1130 towards the crankshaft 1300 effectively shortens the time in which the right exhaust ports 1163 are open. In an extreme example, the right cylinder liner 1130 moves an axial distance towards the crankshaft 1300 sufficient so that the right inner piston 1220 only partially opens the right exhaust ports 1263 further reducing the time in which the exhaust fluid exists the right exhaust ports 1263.

Figure 10:
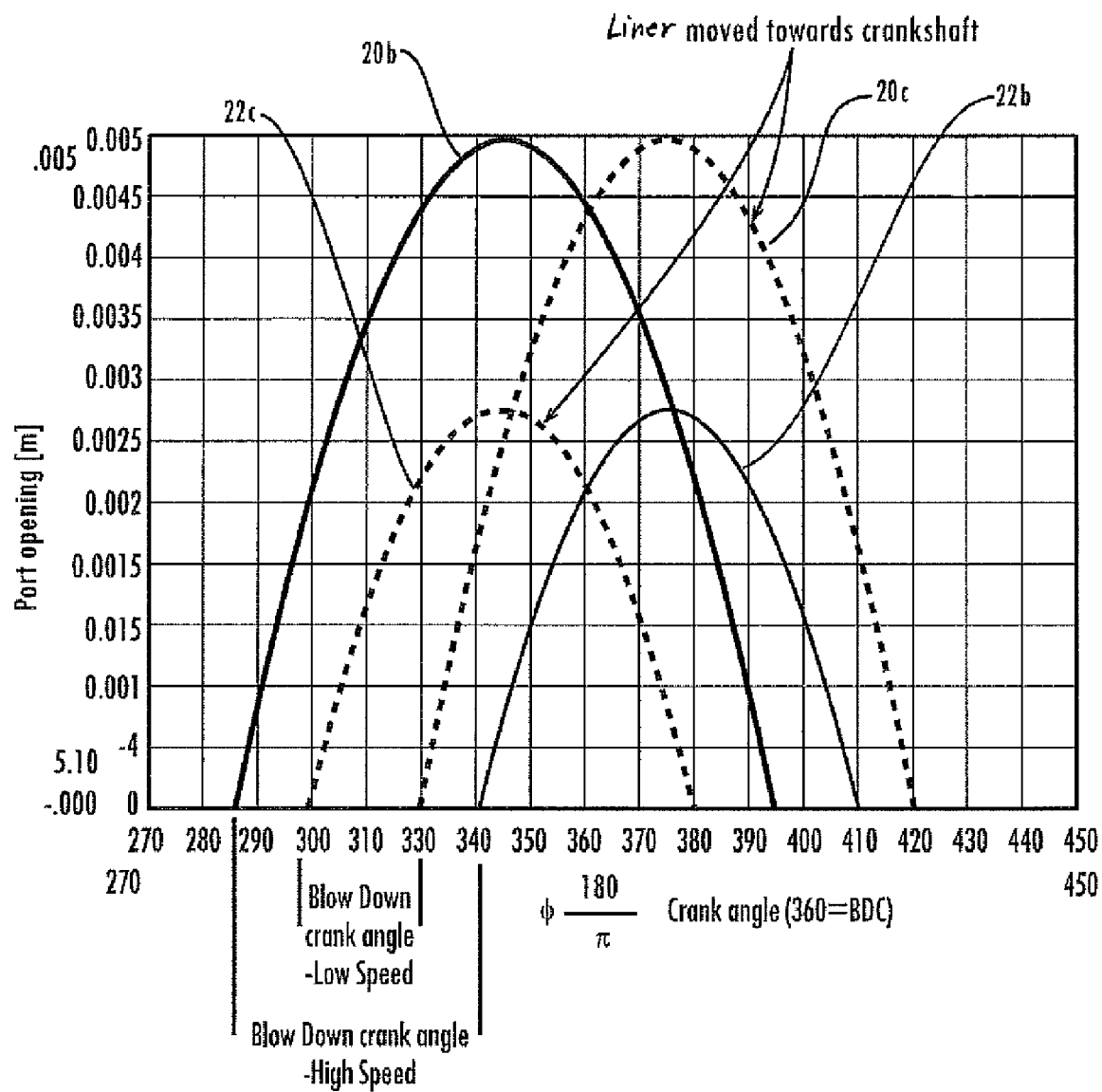
FIG. 10 is a graph representing asymmetric timing of the opening and closing of the intake ports and the exhaust ports as a function of crankshaft angle in accordance with the present invention.

FIG. 10 is a graph representing asymmetric timing of the opening and closing of the intake ports and the exhaust ports as a function of crankshaft angle, in accordance with an embodiment of the present invention. A first intake port curve 22b shows the opening and closing of the intake ports as a symmetric curve offset from the axis of a first exhaust port curve 20b which shows the opening and closing of the exhaust ports. Movement of the left cylinder liner 1130 provides a shifting of the timing of the intake and exhaust ports, an example shown as a second intake port curve 22c and second exhaust port curve 20c. By moving the left cylinder liner 1130, preferential port timing in relation to the engine speed and load is achievable.

The cylinder liner 1130, 1230 is moved in an axial direction by a number of suitable means. In one embodiment in accordance with the present invention, the cylinder liner 1130, 1230 is moved using an actuating means, including, but not limited to, an electric motor, hydraulic actuator, and the like. The actuating means is controlled by a feedback control system (not shown) that controls the position of the cylinder liner 1130, 1230 to a predetermined position in accordance with predetermined engine speed, or other performance parameter.

In another embodiment in accordance with the present invention, fluid pressure acting upon a portion of the cylinder liner overcoming a restoring element is used to position the cylinder liner 1130, 1230. FIG. 11 is a side cross-sectional view of an engine 12 in accordance with an embodiment of the present invention. Looking at the right cylinder 1200, the left cylinder 1100 being similarly arranged (not shown), the housing 1103 comprises a fluid inlet 1264 adapted to provide controllable hydraulic pressure on the exhaust end of the right cylinder liner 1230. The right cylinder liner 1230 further comprises one or more flanges 1237 suitable for coupling with a bias member 1259. The bias member 1259 is adapted to provide a restoring force on the right cylinder liner 1230 as the right cylinder liner 1230 is pushed towards the crankshaft 1300 by the hydraulic pressure on the intake end 1236.

In one embodiment in accordance with the present invention, the fluid used to provide the hydraulic pressure on the right cylinder liner 1230 is cooling fluid used to cool the right cylinder liner 1230. The pressure of the cooling fluid is controlled by a feedback control system (not shown) that controls the position of the cylinder liner 1130, 1230 to a predetermined position in accordance with predetermined engine speed, or other performance parameter.

Engines in accordance with embodiments of the present invention are configured to be powered by any number of internal combustion processes, such as, but not limited to, those combustion processes associated with spark ignition (SI), Diesel, and Homogeneous Charge Compression Ignition (HCCI).

In the SI-combustion process, a homogeneous air and fuel mixture is compressed within the cylinder and ignited at the end of the compression stroke by a spark. The spark causes a flame kernel, or a heat front wave, that grows and propagates throughout the combustion chamber. Engine load (torque) is controlled by controlling the rate of flow of the air and fuel to the cylinder. The air and fuel ratio is kept substantially constant at all loading conditions.

The flame kernel produces a flame front in the cylinder that has a temperature in excess of 1600 C, the temperature in which nitrogen-oxides ($NO_x$) are produced. Therefore, some means of mitigating $NO_x$ production is required, such as, but not limited to catalytic conversion to a safer compound.

In an embodiment of the present invention, the cylinder volume is divided into a combustion chamber and the cylinder, and further comprising a $NO_x$-reducing heat sink or a catalytic converter between the combustion chamber and the cylinder (such as provided in PCT application number PCT/US 03/08708 entitled ENGINE WITH POWER GENERATING CAPABILITY, incorporated herein by reference). For reaction kinetic reasons, and, in order to maintain the optimum configuration for scavenging, the converter is attached to the exhaust piston; fuel is injected by spraying directly into the combustion chamber. Such a combustion system offers a breakthrough in extreme low emission combustion without sacrificing the fuel consumption, power output or comfort.

In the Diesel combustion process, pure air is first compressed in the cylinder, causing the air to increase in temperature. Fuel is injected under high pressure at the end of the compression stroke, into the hot compressed air. The fuel is vaporized and mixed partially with the compressed air. The air and fuel mixture self-ignites when brought to a predetermined temperature. Engine load is controlled by varying the amount of fuel injected into the cylinder.

HCCI is an abbreviation for "Homogeneous Charge Compression Ignition". The name implies that the homogeneous ("well mixed") charge of air and fuel is ignited by compression heating.

In the HCCI combustion process, a homogeneous air and fuel mixture is compressed within the cylinder. As the temperature of the air and fuel mixture is increased due to the increase in pressure, auto-ignition occurs. The HCCI combustion process requires a high compression ratio in order to ensure auto-ignition. A very lean mixture is used in order to slow the chemistry reaction rate, and therefore reduce the combustion rate. Suitable air and fuel mixtures can be achieved by using a high air and fuel ratio or by Exhaust Gas Recycling (EGR). Engine load is controlled by varying the amount of fuel in the air and fuel mixture.

The HCCI engine utilizes a high compression ratio and the combustion is fast. This gives a high efficiency at low loads compared to a SI-engine that has low efficiency at part load.

A major advantage of the HCCI combustion process is that it produces a low amount of nitrogen-oxides (NOx). The formation of NOx is strongly dependent on combustion temperature. Higher temperature produces a higher amount of NOx. Unlike the high temperature of greater than 1600 C produced by the flame front of a SI combustion process producing large amounts of NOx, the auto-combustion of the HCCI combustion process is initiated at somewhat less than 1600 C, approximately 875 C.

Further, since the combustion is homogeneous and a very lean mixture is used, the combustion temperature becomes very low relative to that of a flame front of a spark-ignition combustion process. This low temperature results in very low amounts of NOx being produced. A stoichiometric mixture has an air to fuel ratio of 1. For the HCCI combustion process, the closer the air to fuel ratio is to 1, the higher the ignition temperature and the closer to NOx production temperature. Therefore, the HCCI combustion process can be produced using an air to fuel ratio of up to about 10, with the range of 2-10 suitable for producing ignition temperatures well below NOx production temperatures.

Further, the HCCI combustion process does not produced the same levels of soot as the Diesel combustion process.

The HCCI combustion process enables a high thermal efficiency when compared to other combustion processes because the very fast chemical reaction in the combustion chamber is very near to the optimal "Constant Volume Combustion" without the limitation of "knocking." Knocking is a term used to define an abnormal combustion condition, also known as detonation, wherein multiple flame fronts collide inside the combustion chamber, increasing the pressure in the chamber and occurring at inappropriate times during the combustion cycle. Knocking is usually a very undesirable and detrimental condition.

Although embodiments of the present invention can be powered by the HCCI combustion process, control of the combustion process is more difficult than in the SI or Diesel combustion process. The HCCI combustion process provides no direct control of the start of combustion, unlike the spark timing of a SI combustion process. The start of combustion depends on several parameters. The dominant parameters include, among others, the compression ratio and the inlet temperature. Control of these dominant parameters provides a means to control the start of combustion to a desired point in time.

In accordance with embodiments of the present invention, the engine is powered by an assisted HCCI combustion process, wherein the air and fuel mixture is compressed within the cylinder to a predetermined state below the threshold condition where auto-ignition will occur. An energy assist, such as, but not limited to, a heat source such as produced by, among others, a spark plug or glow-plug, is used to initiate combustion maintaining a smooth thermal wave combustion condition. The assisted HCCI combustion process works off the threshold condition, producing controllable and uniform combustion without the occurrence of an ill-timed violent photo-detonation (Knocking).

The energy assist provided for initiating combustion is provided by one of a number of suitable devices, including, but not limited to, a spark plug and glow plug. A glow plug has unique advantages as it does not produce a flame front, unlike the spark plug. A glow plug is a device known in the art that provides a source of rapid heating from an element that is exposed to the air and fuel mixture. Glow plugs are well known for use in Diesel engines for cold starting. Commonly, upon start-up of a Diesel engine, the initial temperature of the air and fuel mixture is too low to sustain auto-ignition. The glow plug provides the needed addition heat source necessary for combustion. After the engine heats up and can contribute to heating the air and fuel mixture, the glow plug is no longer activated.

In accordance with embodiments of the present invention, a glow plug is provided in the cylinder and is adapted to control the time of ignition of the air and fuel mixture. In one embodiment in accordance with the present invention, the timing of the heating of the glow plug is triggered by the position of (one of) the pistons. In another embodiment in accordance with the present invention, the timing of the heating of the glow plug is triggered by the peak pressure of the air and fuel mixture in the cylinder.

In embodiments in accordance with the present invention, the glow plug is controlled by a feedback control system. The feedback control system, in one embodiment, controls the glow plug timing based on predetermined performance criteria. In one embodiment, glow plug heating is timed to produce combustion ignition when the crankshaft is at TDC, which provides the greatest fuel efficiency. In another embodiment, glow plug heating is timed to produce combustion ignition when the combustion chamber reaches peak pressure, typically at 5-10% after TDC.

Further, and in another embodiment, the timing of glow plug heating is determined based upon crankshaft performance parameters, such as, but not limited to, torque variation and angular variation.

In yet another embodiment, and particularly suitable when constant crankshaft speeds are desired, such as, but not limited to, electric generation applications, glow plug heating is timed to produce combustion ignition to optimize power output.

In other embodiments in accordance with the present invention, the temperature of the glow plug is variable and controlled for a particular purpose. By way of example, but not limited thereto, the glow plug temperature is controlled based & upon the temperature of the air and fuel mixture. In another example, the glow plug temperature is controlled based on the temperature of the exhaust fluid. In yet another example, the glow plug temperature is controlled by measured speed oscillations of the crankshaft relative to a desired constant average speed of rotation.

Piston Head

Referring again to FIGS. 2 and 3, side cross-sectional views of the left cylinder 100 in the TDC and BDC positions, respectively, are shown in accordance with an embodiment of the present invention. Only the left cylinder 100 is discussed below as the right cylinder 200 comprises similar components. The left outer piston 110 comprises a left outer piston head 116 and a left outer piston plunger 118 opposite the left outer piston head 116. The left outer piston head 116 terminates at a left outer piston combustion face 111. The left outer piston head 116 is adapted to be slidingly received in close fitting engagement with the left cylinder liner bore surface 139 at the left cylinder liner intake end 136.

The left inner piston 120 comprises a left inner piston head 126 and a left inner piston push end 124 opposite the left inner piston head 126. The left inner piston head 126 terminates at a left inner piston combustion face 121. The left inner piston head 126 is adapted to be slidingly received in close fitting engagement with the left cylinder liner bore surface 139 at the left cylinder liner exhaust end 138.

The left outer piston 110, the left inner piston 120, and the left cylinder liner 130 define a left combustion chamber 150.

Figure 12:
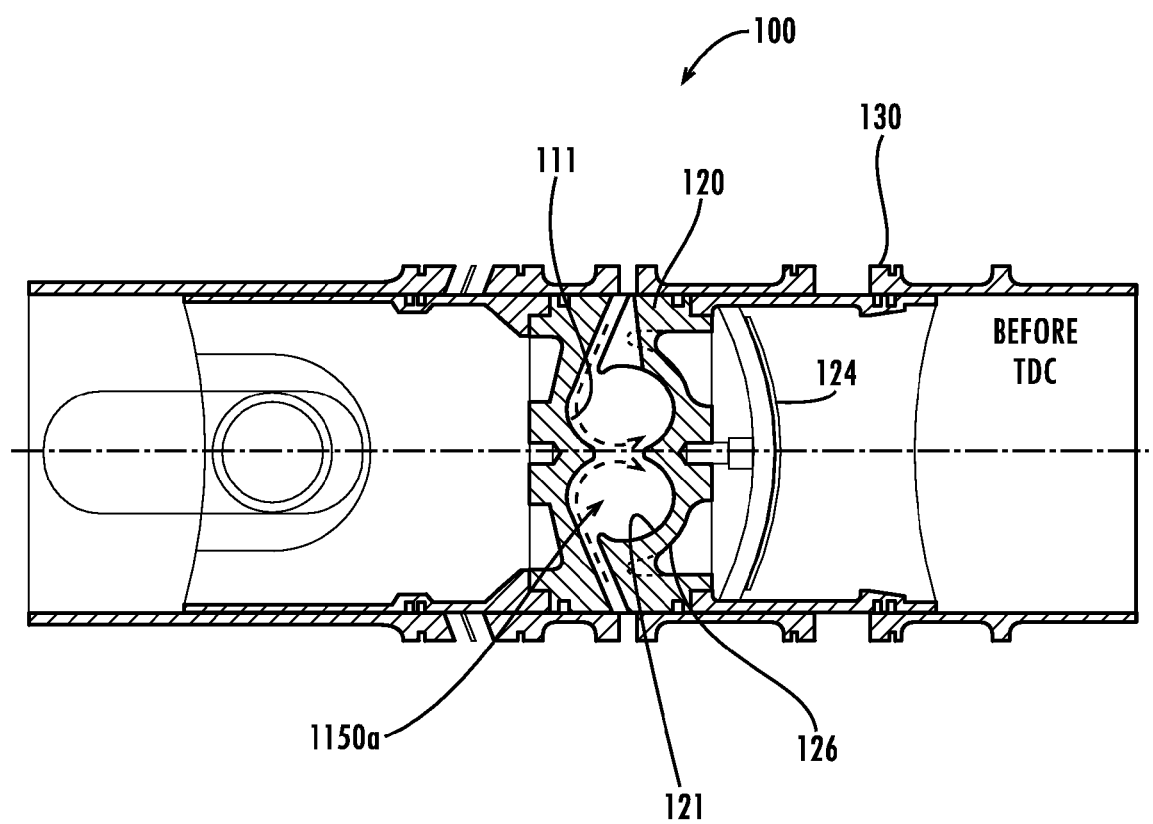
FIG. 12 is a side cross-sectional view of the left cylinder including a left face and left inner piston combustion face near top dead center forming a torroidal combustion chamber, in accordance with an embodiment of the present invention.

Embodiments of the present invention provide unconventional design of the shape of the left outer piston combustion face 111 and left inner piston combustion face 121, and therefore the overall shape of the left combustion chamber 100, because there are no valves. FIG. 12 is a side cross-sectional view of the left cylinder 100 including a left outer piston combustion face 111 and left inner piston combustion face 121 near top dead center forming a torroidal combustion chamber 1150a, in accordance with an embodiment of the present invention, as first presented in PCT/US00/34122 entitled INTERNAL COMBUSTION ENGINE WITH A SINGLE CRANKSHAFT AND HAVING OPPOSED CYLINDERS WITH OPPOSED PISTONS, incorporated herein by reference. The combustion chamber 1150a is formed by the left outer piston combustion face 111 having a convex torroidal shape matching the left inner piston combustion face 121 with a complimentary profile. The left outer and inner piston combustion faces 111, 121 form a broad area squish band that creates a swirl of high intensity near top dead center providing the potential for improved exhaust emissions, and also fuel consumption, power output and comfort Other shapes of the left outer piston combustion face 111 and left inner piston combustion face 121 are anticipated, suitable for a particular purpose.

Figure 13:
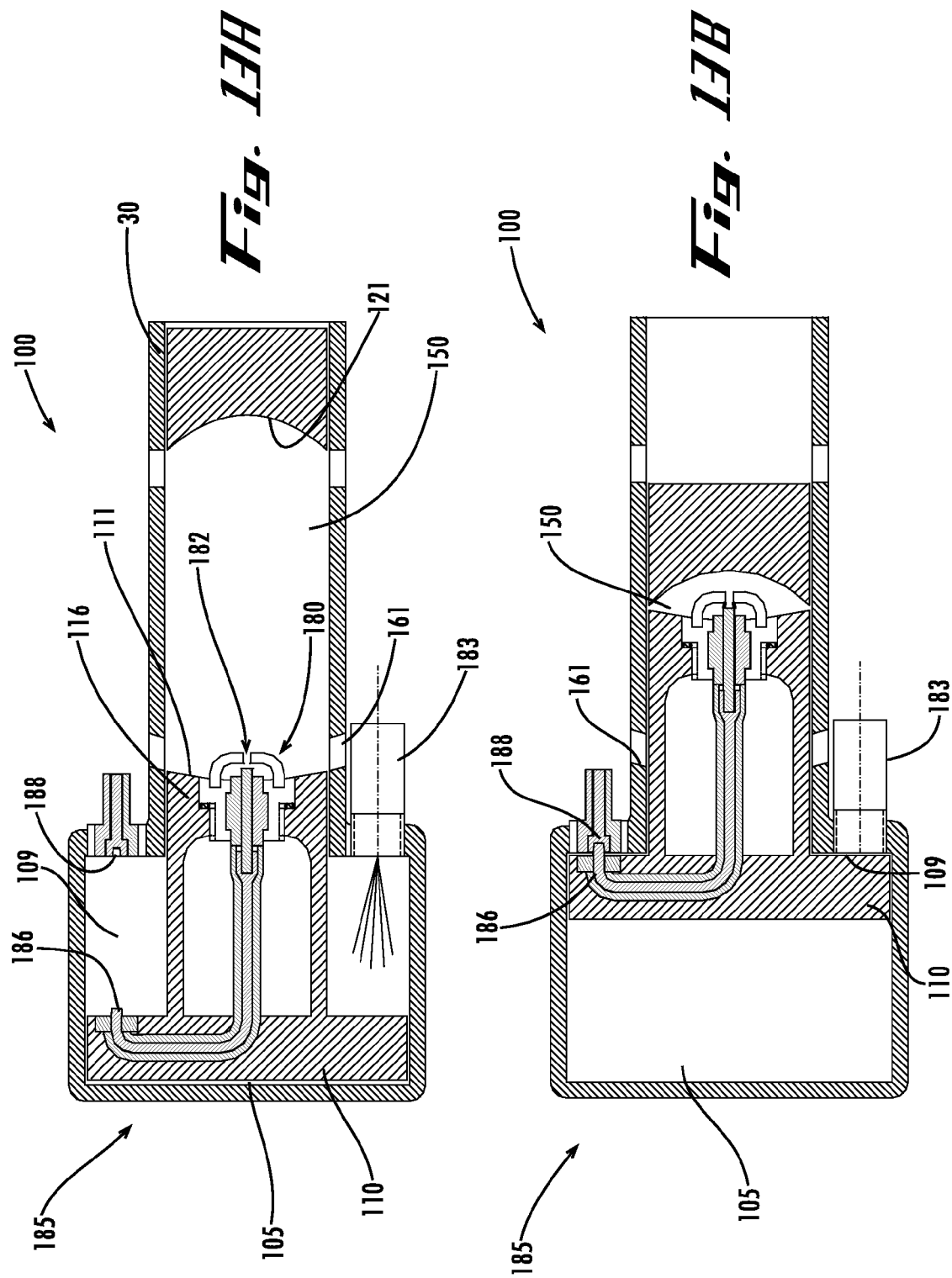
FIGS. 13A and 13B are partial cross-sectional views of an engine including the left cylinder comprising an intermittent-contact spark ignition system in a disengaged and engaged position, respectively, in accordance with an embodiment of the present invention.

FIG. 13A is a side cross-sectional view of the left cylinder 100 comprising the left outer piston head 116 including a left outer piston combustion face 111 and a spark igniter 180, such as, but not limited to a conventional spark plug known in the art, in accordance with an embodiment of the present invention. The spark igniter 180 is disposed within the left outer piston head 116 such that a spark gap 182 is suitably located adjacent the outer piston combustion face 111 and suitably exposed to the intake fluid.

It is understood that the spark igniter 180 could be located on other components of the left cylinder 100, such as, but not limited to, the left inner piston combustion face 121 and integrated into the side of the left cylinder liner 130.

FIGS. 13A and 13B are partial cross-sectional views of the left cylinder 100 comprising an intermittent-contact spark ignition system 185 in a disengaged and engaged position, respectively, in accordance with an embodiment of the present invention. The intermittent-contact spark ignition system 185 comprises a moving contact 186 extending from the left outer piston 110, and a stationary contact 188 in opposed relationship and in axial alignment to the moving contact 186. The moving contact 186 and the stationary contact 188 come into electrical contact creating an electric discharge at the spark gap 182 when the left outer piston head 116 moves substantially to the TDC position. The moving contact 188 and the stationary contact 186 move apart out of electrical contact at all other positions of the left outer piston 110.

In an embodiment of the present invention, the spark tiring is adjustable by adjusting the relative axial position of the stationary contact 188. An earlier spark timing is obtained by moving the stationary contact 188 closer to the moving contact 186, whereas a retarded spark timing is obtained by moving the stationary contact 188 further away from the moving contact 186.

Figure 14:
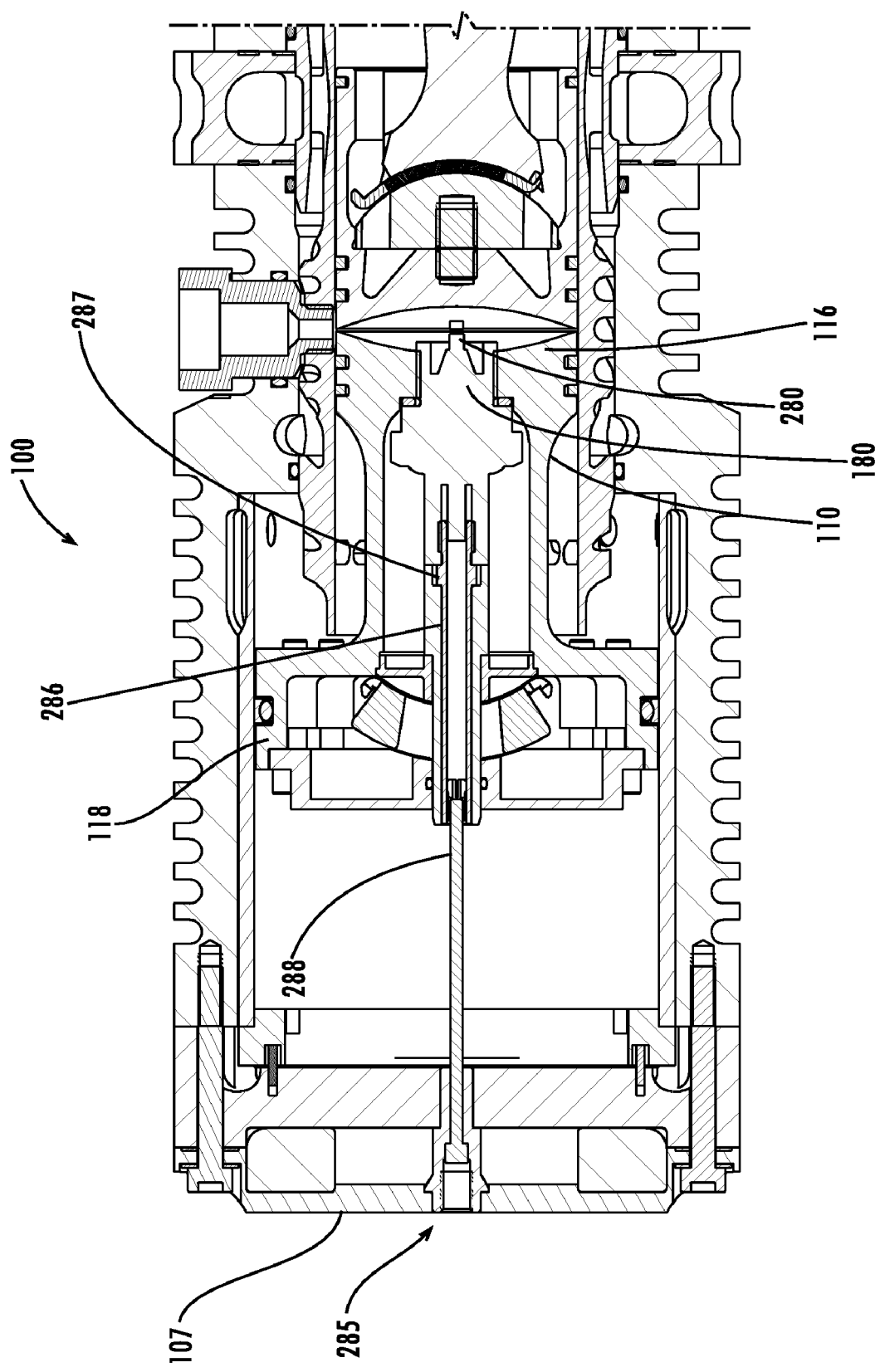
FIG. 14 is a partial cross-sectional view of the left cylinder comprising a sliding-contact ignition system, in accordance with an embodiment of the present invention.

FIG. 14 is a partial cross-sectional view of the left cylinder 100 comprising a sliding-contact ignition system 285, in accordance with an embodiment of the present invention. As in the embodiment of FIG. 11A, above, an ignition source, such as a spark igniter 180 or a glow plug 280 as shown, is disposed within the left outer piston head 116. The sliding-contact ignition system 285 comprises a receiving contact 286 extending from the glow plug 280 to the left outer piston plunger 118 and a sliding contact 288 extending from the left housing end cap 107 and in axial alignment with the receiving contact 286. The receiving contact 286 provides a surface 287 for nesting engagement with the sliding contact 288.

The receiving contact 286 and the sliding contact 288 remain in electrical contact throughout the stroke movement of the left outer piston 110, the sliding contact 288 sliding within the receiving contact 288. In the case of the ignition source being a spark igniter 180, the spark igniter 180 is controlled in the conventional manner that when the left outer piston head 116 moves substantially to the TDC position, the spark igniter 180 is caused to create an electric discharge at the spark gap 182. In the case of the glow plug 280, the heating of the glow plug 280 can be controlled at any portion of the piston cycle. For example, but not limited to, the glow plug 280 can be controlled to heat the intake fluid to a predetermined temperature during scavenging, whereas it is controlled to produce a high temperature surge at TDC. In other words, a glow plug 180 can be operated continuously to heat the intake fluid, whereas the spark plug 180 can only be used for ignition.

In accordance with an embodiment of the present invention, the spark igniter 180 as shown in FIG. 13A is replaced with a glow plug 280. The glow plug 280 provides a source of heat that augments the self ignition of the intake fluid under pressure. As the pressure and therefore the temperature of the intake fluid raises during the compression phase of the cycle, the glow plug 280 is activated to provide a source of heat to the intake fluid so as to assist the intake fluid to self ignite at a predetermined time in the cycle.

The glow plug 280 does not have to operate at the extreme temperature as that of an electric discharge in order to provide conditions for self ignition of the intake fluid. By way of example, during engine startup the intake fluid is relatively cool, wherein the glow plug 280 raises the intake fluid temperature sufficient that with additional compression of the intake fluid at TDC, the temperature of the intake fluid is sufficient to sustain self ignition. Further, the relatively low-temperature ignition of the intake fluid about the glow plug 280 acts to provide a pressure source, much like a piston, compressing the intake fluid further and raising the fluid temperature to above the self-ignition temperature, causing a uniform combustion of the intake fluid throughout the left combustion chamber 1150.

Ideally, for performance and emissions considerations, among others, combustion of the intake fluid within the left combustion chamber 1150 should occur uniformly, spontaneously, and completely. Spark ignition typically, and in some cases glow-plug ignition, produces non-uniform combustion of the intake fluid. A flame front can be produced that advances through the combustion chamber producing non-uniform and non-complete combustion of the intake fluid. The detrimental effects of the flame front is reduced in embodiments of the present invention wherein self ignition conditions are provided in the combustion chamber and ignition by a spark or glow plug occurs at about the self ignition conditions.

Figure 15A:
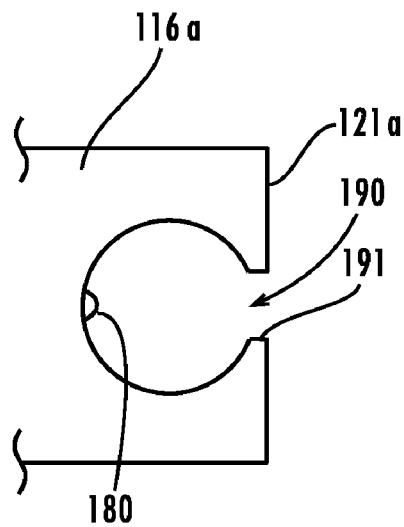
FIG. 15A is a partial side cross-sectional view of a left outer piston head wherein the glow plug extends into a spherical cavity formed in the left outer piston head extending from the left inner piston combustion face, in accordance with an embodiment of the present invention.
Figure 15B:
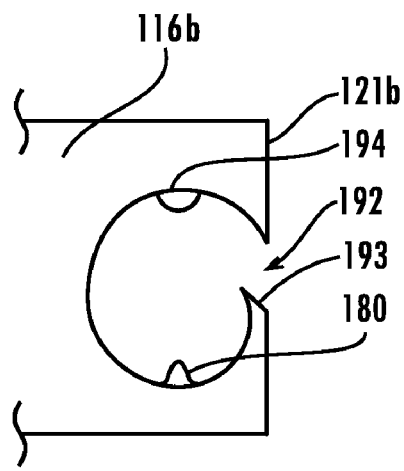
FIG. 15B is a partial side cross-sectional view of a left outer piston head wherein the glow plug extends into a swirl cavity formed in the left outer piston head extending from the left inner piston combustion face, in accordance with an embodiment of the present invention.
Figure 15C:
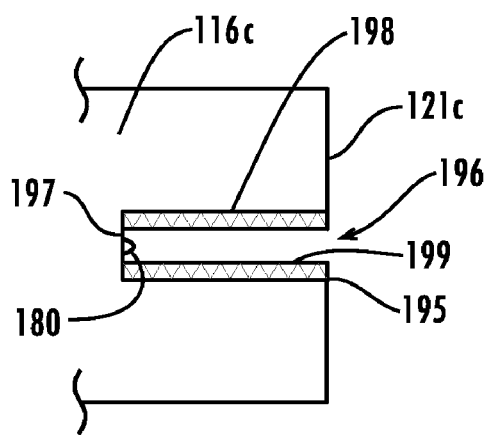
FIG. 15C is a partial side cross-sectional view of a left outer piston head wherein the glow plug extends into a cavity bottom of an elongated cavity formed in the left outer piston head extending from the left inner piston combustion face, in accordance with an embodiment of the present invention.

Other embodiments in accordance with the present invention are provided to minimize or eliminate non-uniform and non-complete combustion. These embodiments include, but are not limited to, contained ignition within a cavity or chamber of a piston. FIGS. 15A-15C are side cross-sectional views of embodiments of left outer piston heads 116*a-c* wherein the glow plug 280 is provided in a cavity formed in the left outer piston head 116*a-c* extending from the left inner piston combustion face 121*a-c*, in accordance with embodiments of the present invention. The glow plug 280 extends into the cavity to heat the intake fluid contained therein. In this arrangement, any flame front that potentially can be produced by the glow plug 280 is substantially contained within the cavity for at least the time it takes for self ignition to take place outside of the cavity. The benefit of a pressure increase of the intake fluid outside of the cavity caused by the ignition of the intake fluid within the cavity is realized to produce a uniform raise in pressure and temperature for uniform, spontaneous and complete combustion within the left combustion chamber 1150.

FIG. 15A is a partial side cross-sectional view of a left outer piston head 116*c* wherein the glow plug 180 extends into a spherical cavity 190 formed in the left outer piston head 116*a* extending from the left inner piston combustion face 121*a*, in accordance with an embodiment of the present invention. The spherical cavity 190 comprises an inlet port 191 that is adapted to direct incoming intake fluid into the spherical cavity 190 but is sufficiently small so as to substantially contain any flame front.

FIG. 15B is a partial side cross-sectional view of a left outer piston head 116b wherein the glow plug 180 extends into a swirl cavity 192 formed in the left outer piston head 116b extending from the left inner piston combustion face 121b, in accordance with an embodiment of the present invention. The swirl cavity 192 comprises an inlet port 193 that is adapted to direct incoming intake fluid to flow adjacent the swirl cavity surface 194 and to be substantially retained within the swirl cavity 192. The glow plug 280 extends into the swirl cavity 192 and is positioned out of the line of sight of the inlet port 193. In this arrangement, any flame front that is potentially produced by the glow plug 280 is directed to the swirl cavity surface 194 opposite the glow plug 280 to reflect there-and-back-again substantially delaying the time in which it may exit the swirl cavity 192.

FIG. 15C is a partial side cross-sectional view of a left outer piston head 116c wherein the glow plug 280 extends into a cavity bottom 197 of an elongated cavity 196 formed in the left outer piston head 116c extending from the left inner piston combustion face 121c, in accordance with an embodiment of the present invention. The elongated cavity 196 comprises an inlet end 195 that is adapted to direct incoming intake fluid to the cavity bottom 197. The depth of the elongated cavity 196 is predetermined such that any flame front produced by the glow plug 280 will not exit the elongated cavity 197 until the self ignition of the intake fluid outside of the elongated cavity 196.

In other embodiments in accordance with the present invention, the cavity, such as the elongated cavity 196 shown in FIG. 15C, among others, comprises an inner surface 198 at least a portion of which having a catalytic layer 199 thereon. In an embodiment, the catalytic layer 199 comprises a material that reduces the quantity of NOx or other undesirable emission that might be formed by a flame front produced within the elongated cavity 196. In another embodiment, the catalytic layer 199 comprises a material that reduces the potential formation of a flame front produced within the elongated cavity 196.

In other embodiments in accordance with the present invention, the heating element of the glow plug 280 further comprises a catalytic material 299. The catalytic material 299 comprises a material that triggers combustion based on the chemistry of the intake fluid. As the intake fluid pressure rises, ignition is triggered when a predetermined concentration of constituent compounds within the intake fluid is reached.

It is understood that in embodiments of ignition systems presented above, among others, spark igniters 180 and glow plugs 280, among others, may be used interchangeably. By way of example, the spark igniter 180 shown in FIG. 13A can be replaced by the glow plug 280 as shown in FIG. 14.

Fuel Supply Systems

Fuel is supplied to embodiments of engines in accordance with the present invention in a variety of ways. Referring again to FIG. 9, a fuel injector 1183 is provided adjacent each left/right cylinder liner 1130, 1230 terminating with a fuel injector port 1184 and in fluid communication with the left/right combustion chamber 1150, 1250, in accordance with an embodiment of the present invention. Intake fluid in the form of air enters the left/right combustion chamber 1150, 1250 through the left/right intake ports 1161, 1261. Fuel is injected in the left/right combustion chamber 1150, 1250 at a suitable time in as the intake fluid is under compression.

Referring again to FIGS. 13A and 13B, a fuel injector 183 is provided in fluid communication with the second scavenging chamber 109. Intake fluid in the form of air is provided from the first scavenging chamber 105 to the second scavenging chamber 109 which is mixed with fuel provided by the fuel injector 109. A fuel and air mixture is provided to the combustion chamber 150 through the intake ports 161 from the second scavenging chamber 109.

Crankshaft

Figure 16:
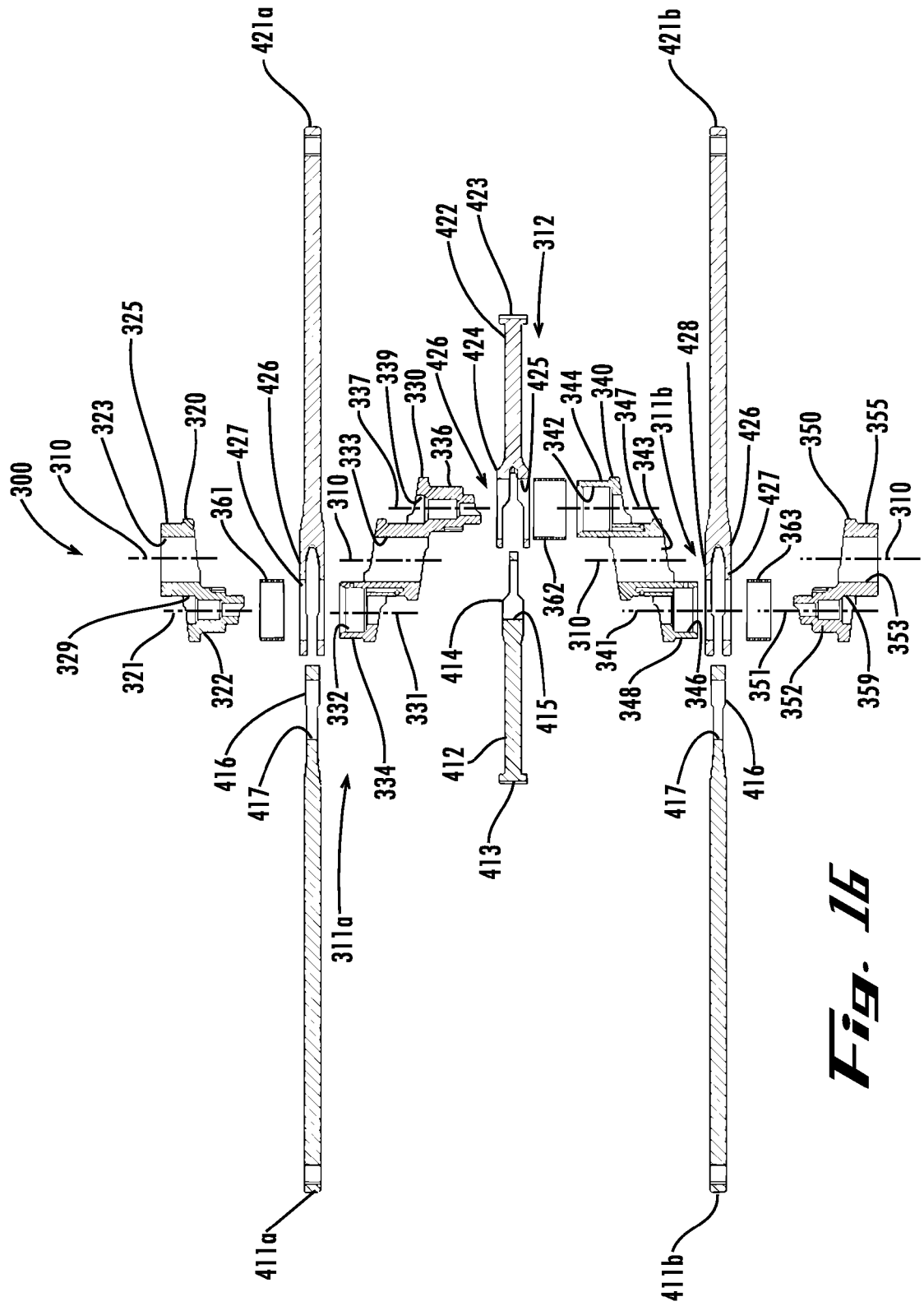
FIG. 16 is a top exploded cross-sectional view of the crankshaft, left/right pullrods and left/right pushrods, in accordance with an embodiment of the present invention.
Figure 17:
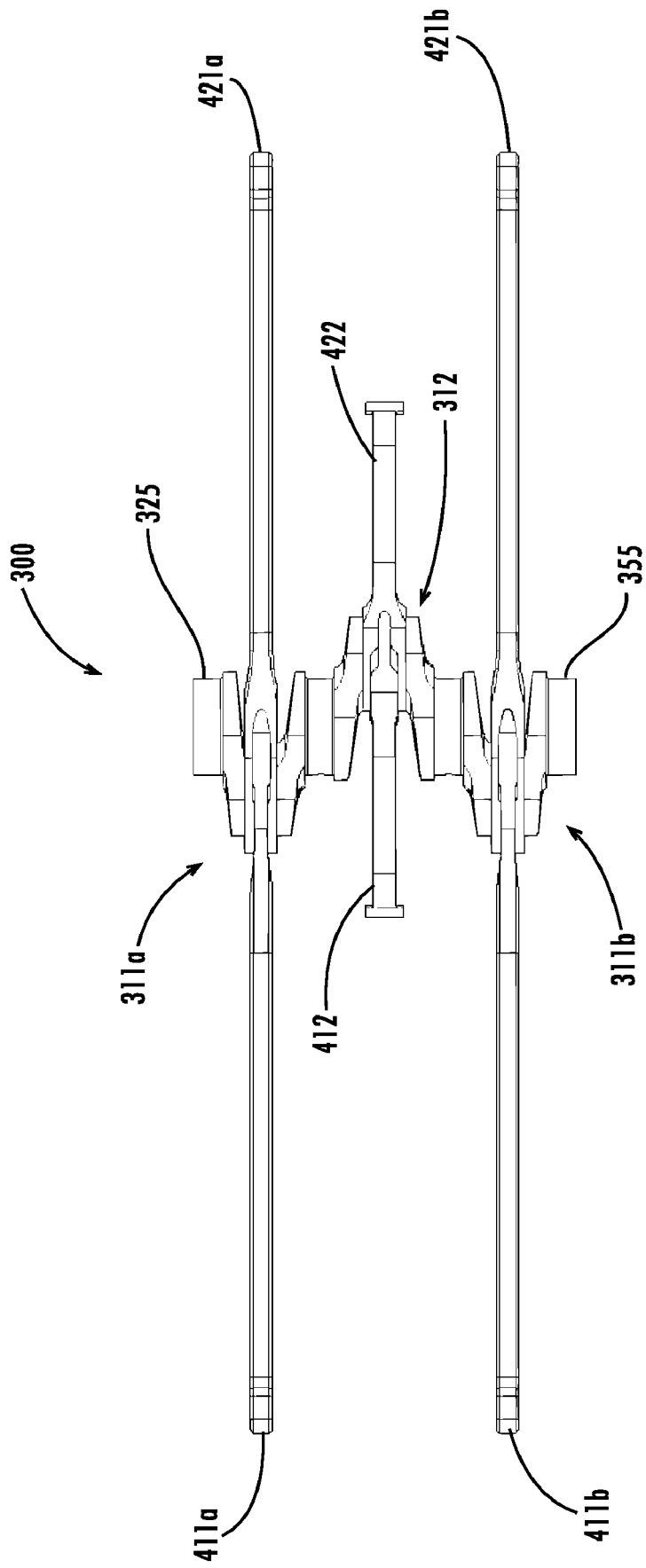
FIG. 17 is an assembled top view of the embodiment of FIG. 16.

FIG. 16 is a top exploded cross-sectional view of the crankshaft 300, left and right pullrods 411a,b, 421a,b and left and right pushrods 412, 422, in accordance with an embodiment of the present invention. FIG. 17 is an assembled top view of the assembly of FIG. 16. The crankshaft 300 is referred to as a "built-up" crankshaft. In contrast to a single forging of a conventional engine crankshaft, embodiments of the crankshaft 300 of the present invention comprise an assembly of four components, a first crankshaft component 320, a second crankshaft component 330, a third crankshaft component 340, and a fourth crankshaft component 350, that are coupled together to form a single crankshaft 300.

The first crankshaft component 320 comprises a cylindrical first main bearing 325 including a first through bore 323 that defines a crankshaft rotation axis 310. The first crankshaft component 320 further comprises a first nesting surface 322 that has a first offset axis 321 that is offset from the crankshaft rotation axis 310. The first main bearing 325 provides support between the crankshaft 300 and the housing 103, as shown in FIG. 1.

The second crankshaft component 330 comprises a second through bore 333 that is coaxial with the first through bore 323 and also defines the crankshaft rotation axis 310. The second crankshaft component 330 furthers comprises a second nesting surface 332 that has a second offset axis 331 that is offset from the crankshaft rotation axis 310, and a third nesting surface 336 having a third offset axis 337 that is offset from both the crankshaft rotation axis 310 and the second offset axis 331. The first nesting surface 322 is adapted to be slidingly received into the second nesting surface 332. The second crankshaft component 330 further comprises a first bearing surface 334 having a cylindrical cross-section and coaxial with the second offset axis 331. The first bearing surface 334 is adapted to accept a first ring bearing 361 thereon, which will be further described below.

The third crankshaft component 340 comprises a third through bore 343 that is coaxial with the first through bore 323 and also defines the crankshaft rotation axis 310. The third crankshaft component 340 further comprises a fourth nesting surface 342 that has a fourth offset axis 347 that is offset from the crankshaft rotation axis 310 and coaxial with the third offset axis 337. The third nesting surface 336 is adapted to be slidingly received into the fourth nesting surface 342. The third crankshaft component 340 further comprises a second bearing surface 344 having a cylindrical cross-section and is coaxial with the fourth offset axis 349. The second bearing surface 344 is adapted to accept a second ring bearing 362, which will be described below.

The third crankshaft component 340 further comprises a fifth nesting surface 346 that has a fifth offset axis 341 that is offset from the crankshaft rotation axis 310 and coaxial with the second offset axis 331. The third crankshaft component 340 further comprises a third bearing surface 348 having a cylindrical cross-section. The third bearing surface 348 is adapted to accept a third ring bearing 363 thereon, which will be further described below.

The fourth crankshaft component 350 comprises a cylindrical second main bearing 355 including a fourth through bore 353 that is coaxial with the first through bore 323 and also defines the crankshaft rotation axis 310. The fourth crankshaft component 350 further comprises a sixth nesting surface 352 that has a sixth offset axis 351 that is offset from the crankshaft rotation axis 310 and coaxial with the fifth offset axis 341, which is also coaxial with the first and second offset axes 321, 331. The third bearing surface 348 of the third crankshaft component 340 is coaxial with the sixth offset axis 351. The sixth nesting surface 352 is adapted to be slidingly received into the fifth nesting surface 346. The second main bearing 355 provides support between the crankshaft 300 and the housing 103, as shown in FIG. 1.

It is understood that there are many different possible arrangements of nesting surfaces and bearing surfaces wherein the above embodiment is just one of those possible arrangements and is not limited thereto. Other possible arrangements are also anticipated.

In an embodiment in accordance with the present invention, the respective nesting surfaces are adapted to allow for a press-fit assembly with sufficient fastness to remain in axial and angular alignment, but allowing for disassembly. In another embodiment, the respective nesting surfaces have keys and key ways to ensure proper axial and angular alignment.

Pushrods

The two pair of left and right pullrods 411a,b, 421a,b and the pair of left and right pushrods 412, 422 are the connecting elements between the pistons and the crankshaft 300, as shown in FIGS. 16 and 17, in accordance with an embodiment of the invention. The linear reciprocation of the pistons drive the connecting elements to impart rotational motion to the crankshaft 300.

Figure 18:
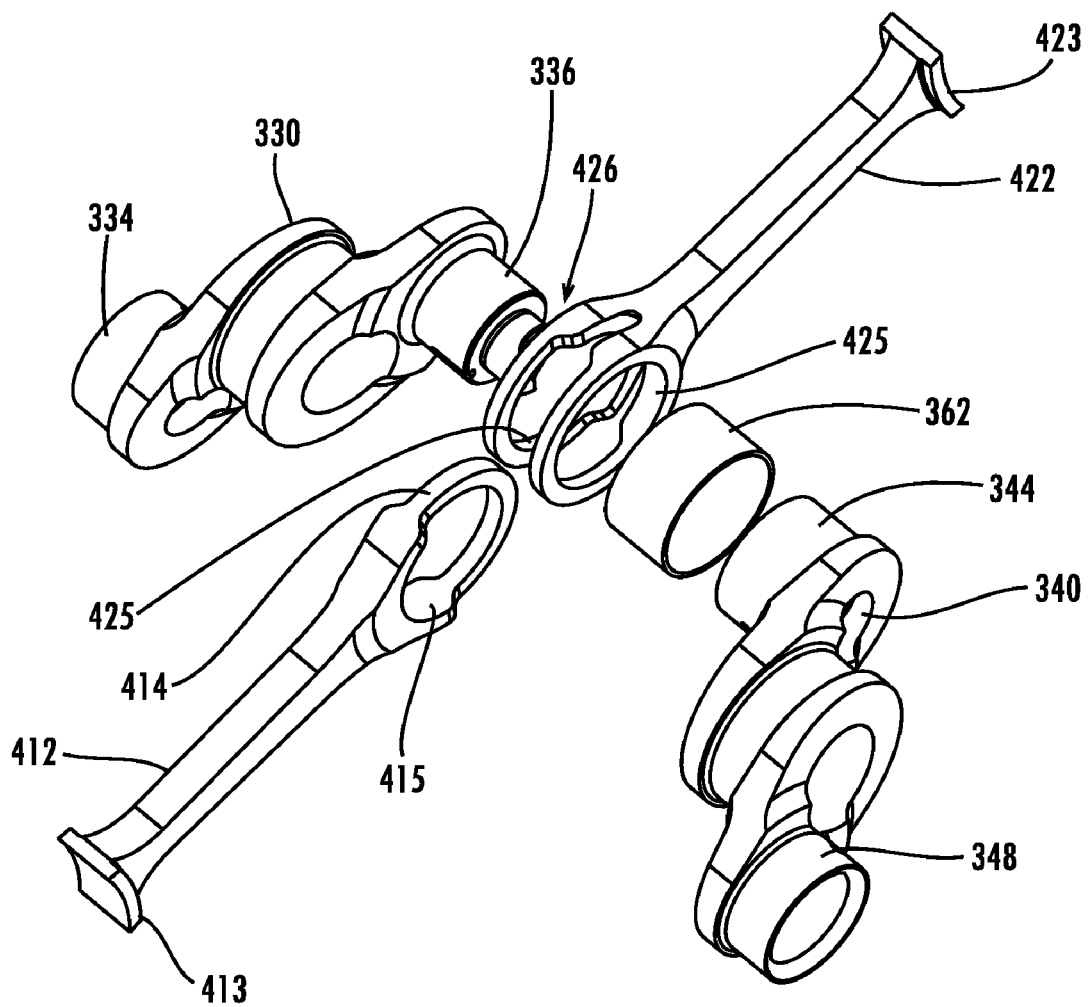
FIG. 18 is an isometric exploded view of the left/right pushrods, the second and third crankshaft components, and the second roller bearing, in accordance with an embodiment of the present invention.

FIG. 18 is an isometric exploded view of the left and right pushrods 412, 422, the second and third crankshaft components 330, 340, and the second roller bearing 362, in accordance with an embodiment of the present invention. The left and right pushrods 412, 422 resist compressive forces by the left and right inner piston 120, 220 as provided earlier and shown in FIG. 1, and are therefore termed "pushrods." As shown in FIGS. 1, 16-18, the left and right pushrods 412, 422 are disposed on a common inner piston journal 312, also referred herein as a pushrod journal, on the crankshaft 300.

In embodiments in accordance with the present invention, the left and right pushrods 412, 422 lie in a common plane. An embodiment that permits coplanar alignment of the left and right pushrods 412, 422 comprises the left pushrod 412 having a single aperture journal end 414 opposite the left concave end 413. The single aperture journal end 414 has a single aperture 415 that is adapted to rotatably engage around the second ring bearing 362 in close-fitting engagement.

The right pushrod 422 comprises a double aperture journal end 424 opposite the right concave end 423. The double aperture journal end 424 comprises a pair of tangs 426, also referred to as a fork, each with a coaxial aperture 425 that is adapted to rotatably engage around the second ring bearing 362 in close-fitting engagement. The tangs 426 are spaced-apart a predetermined distance to slidably receive the single aperture journal end 414 of the left pushrod 412.

The left and right pushrods 412, 422 are assembled onto the crankshaft 300 by receiving the single aperture journal end 414 of the left pushrod 412 between and in coaxial alignment with the pair of coaxial apertures 425 of the double aperture journal end 424 of the right pushrod 422. The second ring bearing 362 is slidably received within the single aperture 415 and coaxial apertures 425. The fourth nesting surface 342 of the third crankshaft component 340 is disposed within the second ring bearing 362. The third nesting surface 336 of the second crankshaft component 330 is disposed within the fourth nesting surface 342 of the third crankshaft component 340 completing the assembly. The left and right pushrods 412, 422 now share a common journal of the crankshaft 300, and therefore, a common journal 312.

The above embodiment is characterized by the elimination of bolts or other fasteners, increasing component reliability and performance.

In one embodiment of the present invention, the left and right pushrods 412, 422 have a ratio of length divided by crankshaft radius of about 5. This relatively large ratio results in much lower side forces and frictional loss between the inner pistons 120, 220 and the cylinder liner bore surface 139, 239, as compared to conventional engines. Typical prior art ratios are in the range of 3.2 to 3.8.

Pullrods

The pair of left and right pullrods 411a,b, 421a,b resist tensile forces by the left and right outer piston 110, 210 as provided earlier and shown in FIG. 1, and are therefore termed "pullrods." As shown in FIGS. 1, 16 and 17, the left and right pullrods 411a,b, 421a,b are disposed on a common pair of outer piston journals 311a,b, also referred herein as a pullrod journals, on the crankshaft 300.

In embodiments in accordance with the present invention, the left and right pullrods 411a,b, 421a,b lie in a common plane. The embodiment that permits coplanar alignment of the left and right pushrods 412, 422 as provided above serves to also permit coaxial alignment of the left and right pullrods 411a, b, 421a, b. In an embodiment, the left pullrods 411a,b have a single aperture journal end 416. The single aperture journal end 416 has a single aperture 417 that is adapted to rotatably engage around one of the first and third ring bearings 361, 363 in close-fitting engagement.

The right pullrods 421a,b comprise a double aperture journal end 426. The double aperture journal end 426 comprises a pair of tangs 428 each with a coaxial aperture 427 that is adapted to rotatably engage around one of the first and third ring bearings 361, 363 in close-fitting engagement. The tangs 428 are spaced-apart a predetermined distance to slidably receive the single aperture journal end 416 of the left pullrod 411a,b.

The left and right pullrods 411a,b, 421a,b are assembled onto the crankshaft 300 by receiving the single aperture journal end 416 of the left pullrod 411a, b between and in coaxial alignment with the pair of coaxial apertures 427 of the double aperture journal end 426 of the right pullrods 421a,b. One of the first and third ring bearings 361, 363 is slidably received within the single aperture 417 and coaxial apertures 427. The second nesting surface 332 of the second crankshaft component 330 is disposed within the first ring bearing 361. The first nesting surface 322 of the first crankshaft component 320 is disposed within the second nesting surface 332 of the second crankshaft component 330 completing the assembly. One pair of the left and right pullrods 411a, 421a now share a common journal of the crankshaft 300.

Similarly, the fifth nesting surface 346 of the third crankshaft component 340 is disposed within the third ring bearing 363. The sixth nesting surface 352 of the fourth crankshaft component 350 is disposed within the fifth nesting surface 346 of the third crankshaft component 340 completing the assembly. The other pair of left and right pullrods 411b, 421b now share a common journal of the crankshaft 300, and therefore, a common journal 311a,b.

The above embodiment is characterized by the elimination of bolts or other fasteners, increasing component reliability and performance.

In embodiments of the present invention provide relatively long left and right pullrods 411a,b, 421a,b. The ratio between the length of the left and right pullrods 411a,b, 421a,b and the crankshaft radius is greater than about 10. This configuration results in much lower side forces and friction between the outer pistons 110, 120 and the cylinder liner bore surface 139, 239, than is typical of known art.

Figure 19:
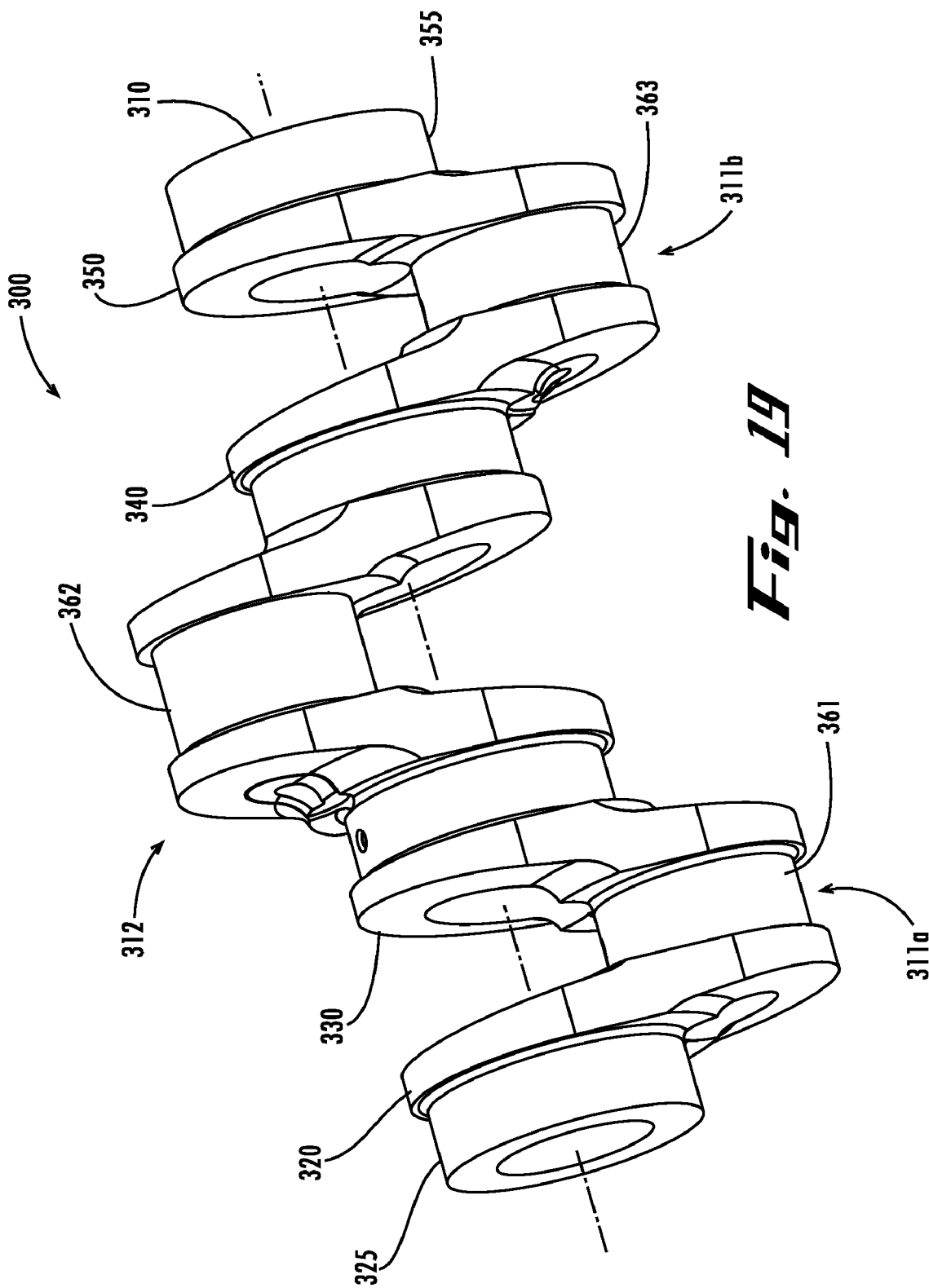
FIG. 19 is an isometric assembled view of a crankshaft, in accordance with an embodiment of the present invention.

FIG. 19 is an isometric assembled view of a crankshaft 300, in accordance with an embodiment of the present invention. The first, second, and third ring bearings 361, 362, 363 described above provide for friction reduction between the journal ends 416, 426, 414, 424 of the left and right pullrods 411a,b, 421a,b and left and right pushrods 412, 422 and the respective bearing surfaces 334, 344, 348 of the crankshaft 300. The first, second, and third ring bearings 361, 362, 363 are shown by way of example and not limited thereto. It is anticipated that other types of friction reduction components and/or methods can be utilized, such as, but not limited to, needle bearings, roller bearings, lubricious coatings and circulating lubrication fluids.

The built-up crankshaft 300, as shown in FIGS. 1, 16 and 17 by way of example, enables the connecting elements, such as the left and right pullrods 411a,b 421a,b and left and right pushrods 412, 422, along with any associated bearing member, to be pre-assembled. This avoids connecting elements found in the known art such as split connecting rods and split-bearings. Split connecting rods require support structure and fasteners so that they may be assembled to form a one-piece crankshaft. These are eliminated in the present embodiments.

The built-up crankshaft 300, in accordance with embodiments of the present invention, consists of several individual components that are subsequently assembled. The generally smaller individual components offer advantages in the manufacturing process, for example, forging, machining, finishing, and other secondary work. Also, the built-up crankshaft 300 offers the advantage of lighter weight. Because the connecting elements do not require fasteners, simpler elements of lower mass may be used. Moreover, the assembly of the several components may be accomplished during insertion of the crankshaft 300 into the housing 103, for example.

Another characteristic of the present embodiments is that a built-up crankshaft 300 can be used because there is a reduction of force experienced by the crankshaft 300. The balanced nature of the reciprocating components on the engine, and the elimination of unbalanced combustion forces, provides substantially no resultant force on the main bearings 325, 355 supporting the crankshaft 300. Contrary to the known art where literally tons of unbalanced forces are exerted on the crankshaft, the present embodiments have substantially no unbalanced forces. This reduction in forces includes a reduction on the crankshaft main bearings 325, 355 and the engine assembly in general.

In a known conventional in-line or "V"-engine, torque is created by uneven forces on the main bearing and the crankshaft. In the present embodiments, these forces are substantially eliminated, and only two main bearings 325, 355, and no center main bearing, are necessary to support the crankshaft 300 in the housing 103.

Due to the configuration of the various components contemplated in the present embodiments, the crank radius may be only about half of that of a conventional design with a similar piston stroke. In part, the crank radius as defined by the crankcase perpendicular to the cylinder axis, is reduced due to the split throw of the overall piston stroke.

Figure 20:
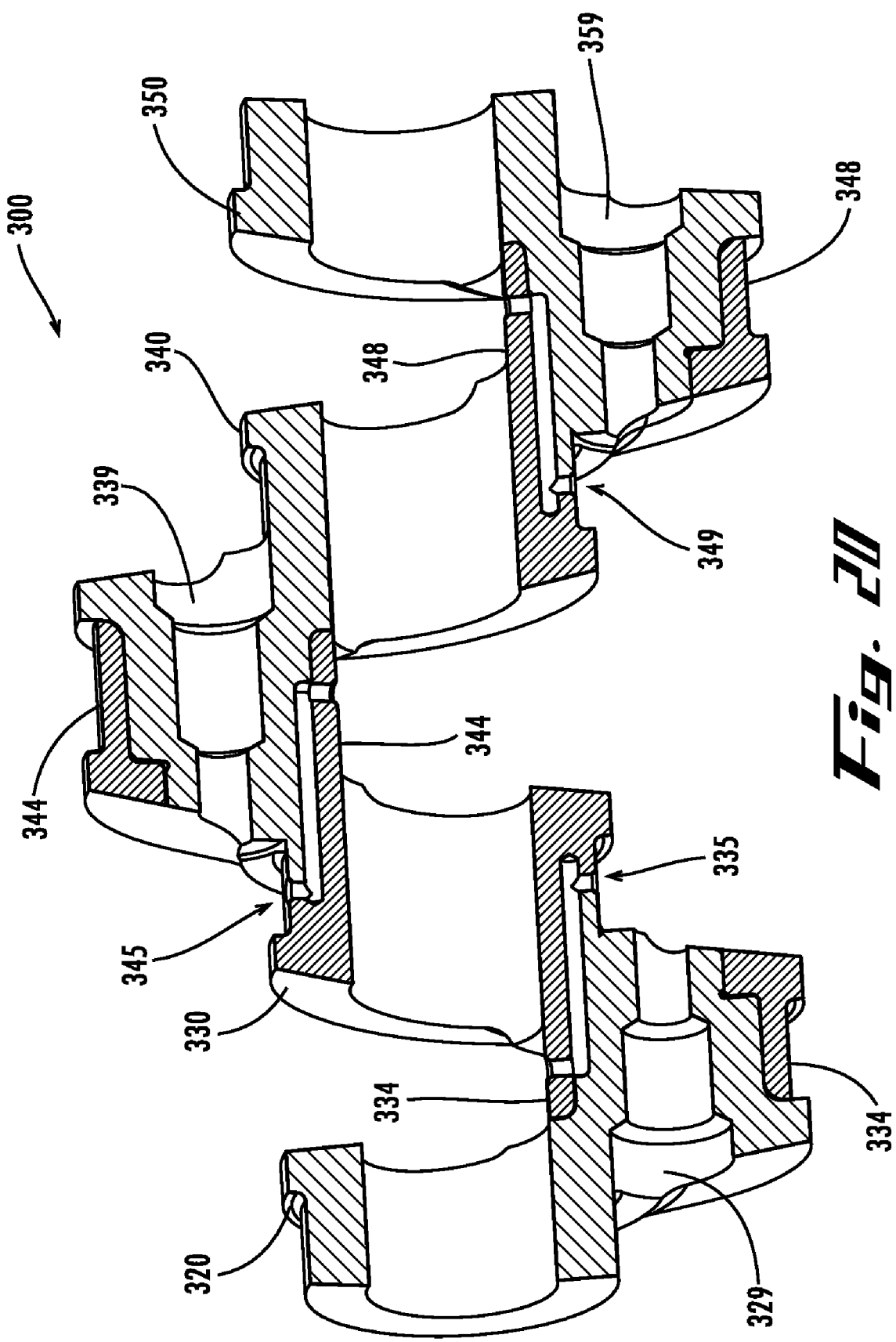
FIG. 20 is a cross-sectional isometric assembled view of the crankshaft of FIG. 19, in accordance with an embodiment of the present invention.

FIG. 20 is a cross-sectional isometric assembled view of the crankshaft 300 of FIG. 19, in accordance with an embodiment of the present invention. The first, third, and fourth crankshaft components 320, 340 and 350 further comprise first, second, and third fluid channels 329, 339, 359, respectively. The first, second, and third fluid channels 329, 339, 359 provide means for fluid, such as, but not limited to, lubricating and cooling fluid, to readily pass through the crankshaft cavity 304, as shown in FIG. 1. The crankshaft 300 further comprises bearing lubrication passages 335, 345, 349 adapted to provide fluid, such as, but not limited to, lubricating and cooling fluid, directly to the first, second, and third bearing surfaces 334, 344, 348, respectively.

The primary role of the crankshaft is to convert the reciprocating motion of the pistons, as conveyed through the pullrods and pushrods, into rotational motion. Unbalanced forces acting on a crankshaft result in increased friction between the crankshaft and its supporting bearings. The existence of unbalanced forces also complicates engine design, since the forces must somehow be mechanically transferred to the supporting structure of the engine, which must be sufficiently sturdy to accommodate the forces. In a standard four cylinder in-line engine, for example, the forces from all four pistons act in the same direction against the crankshaft, and literally tons of pressure must be transferred through the crankshaft main bearings to the engine structure. A typical four cylinder in-line engine will have five main bearings supporting the crankshaft.

Embodiments of engines in accordance with the present invention allow for simpler crankshaft designs, since the reactive forces of the inner and outer pistons in each cylinder is substantially cancelled. Referring to the left cylinder 100 as illustrated in FIG. 1, it can be seen that since the compression and combustion forces acting on the inner and outer pistons 120, 110 will be substantially equal and opposite, the pullrods 411 of the outer pistons 110 will pull against the crankshaft 300 with substantially the same force with which the pushrod 412 of the inner piston 120 pushes. The result will be a turning moment on the crankshaft 300, with only very minor unbalanced side-to-side and up-and-down forces due to the slightly different angles of the pullrods 411 and pushrods 412, and the asymmetrical timing of the pistons. The loads on the crankshaft main bearings 325, 355 are therefore very small, which eliminates the need for any center main bearings and results in much lower friction losses than in an in-line four cylinder engine of comparable performance.

Figure 21:
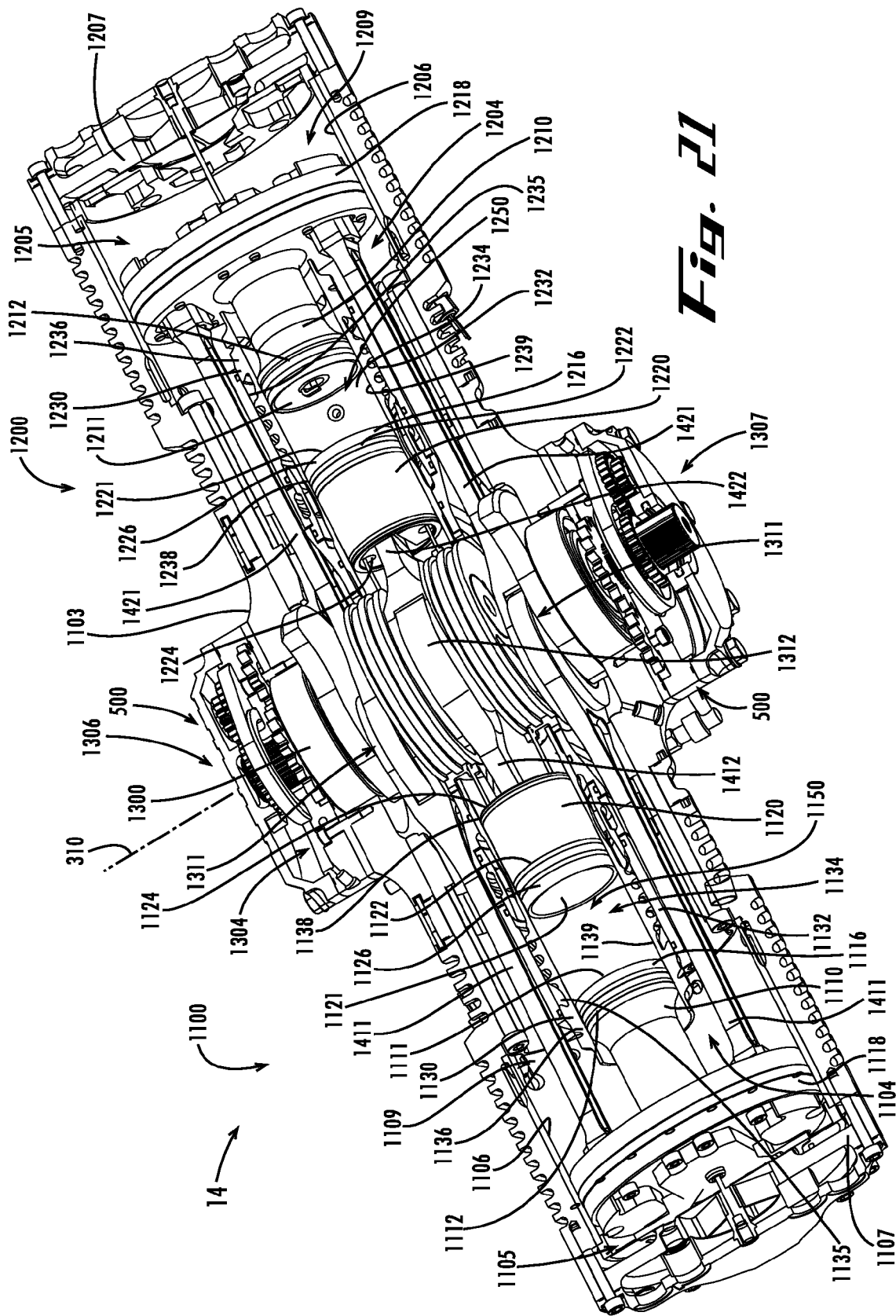
FIG. 21 is a partial cutaway isometric view of an engine, in accordance with an embodiment of the present invention.

FIG. 21 is a partial cutaway isometric view of an engine 14, in accordance with an embodiment of the present invention. The engine 14 comprises a housing 1103 containing a left cylinder 1100, an axially aligned right cylinder 1200 opposite the left cylinder 1100, and a crankshaft 1300 located there between. The crankshaft 1300 comprises a crankshaft first end 1306 and a crankshaft second end 1307. Coupled to each of the crankshaft first and second ends 1306, 1307 is a balancing system 500 described below.

Figure 22:
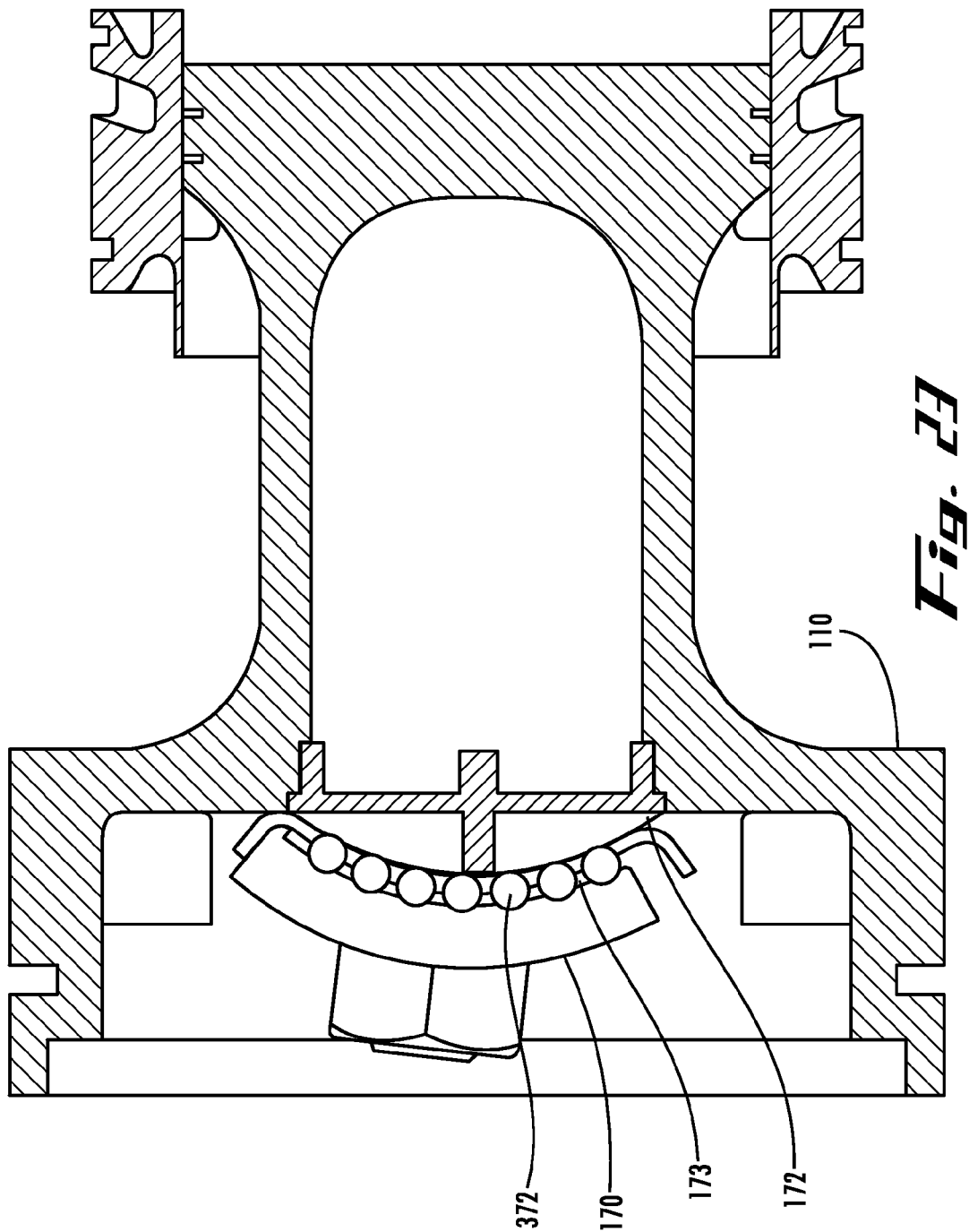
FIG. 22 is a partial cut-away view of a balancing system comprising a balancing system housing, a counter weight, and a planetary gear assembly, in accordance with an embodiment of the present invention.

FIG. 22 is a partial cut-away view of a balancing system 500 comprising a balancing system housing 514, a counter weight 508, and a planetary gear assembly 506, in accordance with an embodiment of the present invention. The balancing system housing 514 is adapted to be coupled to the engine housing 1103 with mounting fasteners 512, described below. The planetary gear assembly 506 comprises a crank shaft gear 518 and a counter-rotating gear 519. The counter weight 508 includes a shaft aperture 516 that is adapted to be placed coaxial with the crank shaft 1300 and free to rotate about the crank shaft axis 310. The crank shaft gear 518 is adapted to be coaxial with, coupled to, and driven by the crank shaft 1300, and adapted to engage the counter-rotating gear 519. The counter-rotating gear 519 is coupled to the counter weight 508. By way of example, the crank shaft 1300 drives the crank shaft gear 518 in a counter clockwise direction. The crank shaft gear 518, in turn, drives the counter rotating gear 519 in a clockwise direction which drives the counter weight 508 in a clockwise direction.

The balancing system 500 is suitable for substantially counter-acting against the minor unbalanced first-order sinusoidal side-to-side and up-and-down forces due to the slightly different angles of the pullrods 411 and pushrods 412 on the crank shaft 1300, and the asymmetrical timing of the pistons. The counter weight 508 is positioned on the crank shaft axis 1300 at a predetermined angle to substantially counter act the unbalanced forces.

Approximately 50% of all friction losses in an engine come from lateral forces produced by the movement of the pullrods 411 and pushrods 412 rotating in their respective journals, acting on the piston, i.e., pushing the pistons against the cylinder liner bore surface 1139, 1239. A short connecting rod produces high lateral forces while a long connecting rod produces low lateral forces (an infinitely long connecting rod would produce no lateral forces on the piston at all, but it would also be infinitely large and infinitely heavy). It is desired to reduce these lateral forces and therefore friction losses without an increase in connecting rod size or weight.

Referring again to FIG. 9, the pushrods 1412, 1422 are subject only to compression loads that eliminate a need for a wrist pin. This is replaced by a concave end 1413, 1423 of large diameter that slides on a mating convex surface 1125, 1225.

Referring again to FIG. 3, the left and right pullrods 411, 421 are coupled to the left and right outer pistons 110, 210 by means of left and right bridges 170, 270. FIG. 23 is a cross sectional view along the cut line 23-23 of FIG. 3 showing the left bridge 170 comprising a bridge concave surface 173 that is adapted to be slidingly received in convex pull surface 172 of the right outer piston 210, in accordance with an embodiment of the present invention. A bridge bearing 372 is used, such as a needle bearing, to reduce the friction between the bridge concave surface 173 and the convex pull surface 172.

Engine with Fluid Dynamic Effect

Again, FIG. 21 is a partial cutaway isometric view of an engine 14 in accordance with another embodiment of the present invention. The engine 14 comprises a housing 1103 containing a left cylinder 1100, an axially aligned right cylinder 1200 opposite the left cylinder 1100, and a crankshaft 1300 located there between. FIG. 21 depicts the engine 14 at a crankshaft angle of 270° after TDC of the left cylinder.

The left cylinder 1100 comprises a left cylinder liner 1130, a left outer piston 1110 and a left inner piston 1120. The left cylinder liner 1130 comprises a left cylinder liner outer surface 1132 and a bore defining a left cylinder liner bore surface 1139. The left cylinder liner 1130 further comprises a left cylinder liner intake end 1136 and a left cylinder liner exhaust end 1138. The left cylinder liner intake end 1136 comprises a plurality of left intake ports 1161 and the left cylinder liner exhaust end 1138 comprises a plurality of left exhaust ports 1163, which will be further described below.

The left outer piston 1110 comprises a left outer piston head 1116 and a left outer piston plunger 1118 opposite the left outer piston head 1116. The left outer piston head 1116 terminates at a left outer piston combustion face 1111. The left outer piston head 1116 is adapted to be slidingly received in close fitting engagement with the left cylinder liner bore surface 1139 at the left cylinder liner intake end 1136.

The left inner piston 1120 comprises a left inner piston head 1126 and a left inner piston push end 1124 opposite the left inner piston head 1126. The left inner piston head 1126 terminates at a left inner piston combustion face 1121. The left inner piston head 1126 is adapted to be slidingly received in close fitting engagement with the left cylinder liner bore surface 1139 at the left cylinder liner exhaust end 1138.

The left outer piston 1110, the left inner piston 1120, and the left cylinder liner 1130 define a left combustion chamber 1150.

Similarly, the right cylinder 1200 comprises a right cylinder liner 1230, a right outer piston 1210 and a right inner piston 1220. The right cylinder liner 1230 comprises a right cylinder liner outer surface 1232 and a bore defining a right cylinder liner bore surface 1239. The right cylinder liner 1230 further comprises a right cylinder liner intake end 1236 and a right cylinder liner exhaust end 1238. The right cylinder liner intake end 1236 comprises a plurality of right intake ports 1261 and the right cylinder liner exhaust end 1238 comprises a plurality of right exhaust ports 1263, which will be further described below.

The right outer piston 1210 comprises a right outer piston head 1216 and a right outer piston plunger 1218 opposite the right outer piston head 1216. The right outer piston head 1216 terminates at a right outer piston combustion face 1211. The right outer piston head 1216 is adapted to be slidingly received in close fitting engagement with the right cylinder liner bore surface 1239 at the right cylinder liner intake end 1236.

The right inner piston 1220 comprises a right inner piston head 1226 and a right inner piston push end 1224 opposite the right inner piston head 1226. The right inner piston head 1226 terminates at a right inner piston combustion face 1221. The right inner piston head 1226 is adapted to be slidingly received in close fitting engagement with the right cylinder liner bore surface 1239 at the right cylinder liner exhaust end 1238.

The right outer piston 1210, the right inner piston 1220, and the right cylinder liner 1230 define a right combustion chamber 1250.

The left outer piston 1.110 and the right outer piston 1210 are coupled to a pair of common journals, outer piston journals 1311, on the crankshaft 1300. The left inner piston 1120 and the right inner piston 1220 are coupled to a common journal, an inner piston journal 1312. The crankshaft 1300 will be further described below.

The left outer piston 1110 of the left cylinder 1100 is coupled to the crankshaft 1300 by means of a pair of left pullrods 1411, one on either side of the cylinder 1100. Similarly, the right outer piston 1210 of the right cylinder 1200 is coupled to the crankshaft 1300 by two right pullrods 1421. The left and right pullrods 1411, 1421 are coupled to the left and right outer pistons 1110, 1210 by means of bridges 1170, 1270 that ride on convex surfaces 1172, 1272 on the left and right outer pistons 1110, 1210.

The left inner piston 1120 of the left cylinder 1100 is coupled to the crankshaft 1300 by means of a left pushrod 1412; the right inner piston 1220 of the right cylinder 1200 is similarly coupled to the crankshaft 1300 by a right pushrod 1422. The left/right pushrods 1412, 1422 have left/right concave ends 1413, 1423 that ride on left/right convex surfaces 1125, 1225 on the left/right inner piston push ends 1124, 1224 of the left/right inner pistons 1120, 1220, respectively. The left/right pushrods 1412, 1422 and the left/right convex surfaces 1125, 1225 will be further described below.

The four pistons 1110, 1120, 1210, and 1220 have a plurality of piston rings 1112, 1122, 1212, and 1222, respectively, located both behind the combustion faces 1111, 1121, 1211, 1221 and further along the piston heads 1116, 1118, 1216, 1218 to prevent the escape of fluid from between the piston heads 1116, 1118, 1216, 1218 and the bore surface 1115, 1215.

The housing 1103 is adapted to house the left cylinder 1100, the right cylinder 1200, and the crankshaft 1300. The housing 1103 comprises a left cylinder cavity 1104, a right cylinder cavity 1204, and a crankshaft cavity 1304, adapted to house the left cylinder 1100, the right cylinder 1200, and the crankshaft 1300, respectively. The left cylinder cavity 1104 defines a left plunger bore surface 1106 and terminates with a left housing end cap 1107. The left plunger 1107 is adapted to be slidingly received in close fitting engagement with the left plunger bore surface 1106. The left plunger 1107, the left housing end cap 1107, and the left plunger bore surface 1106 define a first left scavenging chamber 1105.

The left cylinder cavity 1104, the left plunger 1107, the left cylinder liner 1130, and the crankshaft 1300 define a second left scavenging chamber 1109. The second left scavenging chamber 1109 is in open fluid communication with the crankshaft cavity 1304 permitting flow of fluid freely there through.

Similarly, the right cylinder cavity 1204 defines a right plunger bore surface 1206 and terminates with a right housing end cap 1207. The right plunger 1207 is adapted to be slidingly received in close fitting engagement with the right plunger bore surface 1206. The right plunger 1207, the right housing end cap 1207, and the right plunger bore surface 1206 define a first right scavenging chamber 1205.

The right cylinder cavity 1204, the right plunger 1207, the right cylinder liner 1230, and the crankshaft 1300 define a second right scavenging chamber 1209. The second right scavenging chamber 1209 is in open fluid communication with the crankshaft cavity 1304 permitting flow of fluid freely there through. Consequently, therefore, the second left scavenging chamber 1109, the crankshaft cavity 1304 and the second right scavenging chamber 1209 are in open fluid communication permitting flow of fluid freely there between.

The free-flow of fluid between the second left scavenging chamber 1109, the crankshaft cavity 1304 and the second right scavenging chamber 1209 provides a fluid dynamic effect of the fluid contained within. This fluid dynamic effect has the effect of preferentially increasing the pressure of the scavenging fluid at the opportune time during the opening phase of the left and right intake ports 1161, 1261. A description of a engine cycle will explain this effect more clearly.

Assume that the left cylinder 1100 is undergoing a power stroke wherein the crankshaft 1300 is at "bottom dead center" (BDC). During the power stroke, the left outer piston 1110 and the left inner piston 1210 are driven apart by the high pressure fluid within the left combustion chamber 1150 produced during combustion. The left outer piston 1110 and thus the left outer piston plunger 1118 is driven towards the left housing end cap 1107, which in turn decreases the volume, and increases the pressure, within the first left scavenging chamber 1105. At a predetermined pressure, a one-way valve 168 (See FIG. 3) within the left outer piston plunger 1118 releases high-pressure fluid from the first left scavenging chamber 1105 into the second left scavenging chamber 1109. At a predetermined time during the high-pressure fluid release from the first left scavenging chamber 1105, the left intake ports 1161 are opened to permit high pressure fluid to enter the left combustion chamber 1150.

Simultaneously with the initiation of the power stroke of the left cylinder 1100, the right cylinder 1200 undergoes the initiation of a compression stroke. During the compression stroke, the right outer piston 1210, and thus, the right outer piston plunger 1218 are driven towards the direction of the crankshaft 1300, and thus the left cylinder 1100. This has the effect of compressing the fluid contained within the second right scavenging chamber 1209, driving the fluid through the right intake ports 1261 when open, as well as driving the fluid through the crankshaft chamber 1304 and into the second left scavenging chamber 1109, raising the pressure within the second left scavenging chamber 1109.

The fluid pressure wave created by the forward momentum of the fluid within the second right scavenging chamber 1209 arrives in the second left scavenging chamber 1109 as the left outer piston 1110 moves in the compressive stroke toward the crankshaft 1300, and while the left intake ports 1161 are open, even as the right outer piston 1210 begins to move in the opposite direction away from the crankshaft 1300, closing the left exhaust ports 163 and further compressing the intake fluid in the left combustion chamber 150. This fluid pressure wave arrives at the open left intake ports 1161 effectively increasing the pressure of the intake fluid for scavenging.

Figure 24:
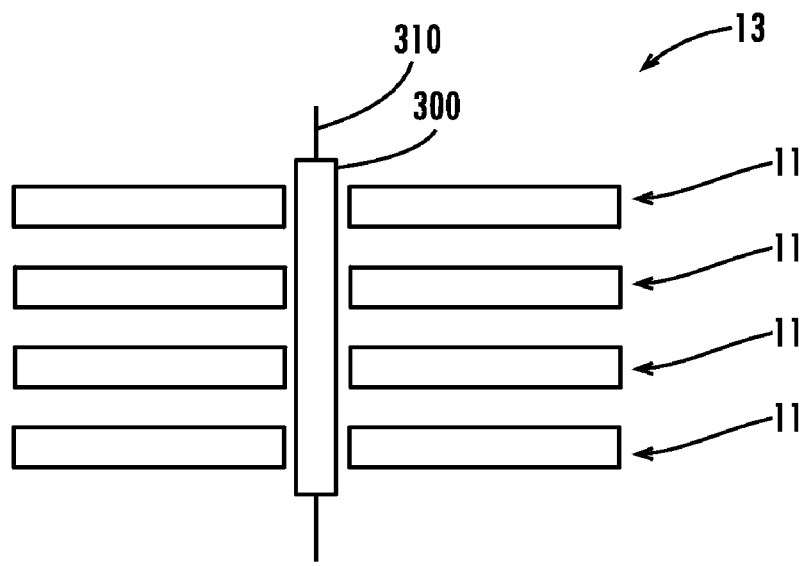
FIG. 24 is a schematic top view of an engine comprising a plurality of OPOC engines, coupled to a common crankshaft in side-by-side parallel relationship, in accordance with an embodiment of the present invention.

FIG. 24 is a schematic top view of an engine 13 comprising a plurality of OPOC engines 11, shown herein with four engines 11, coupled to a common crankshaft 300 having an axis 310 in side-by-side parallel relationship, in accordance with an embodiment of the present invention. Engines 13 of this configuration are characterized by simply coupling additional engines 11 to the common crankshaft 300 for providing additional power output in a relatively flat profile package.

Figure 25:
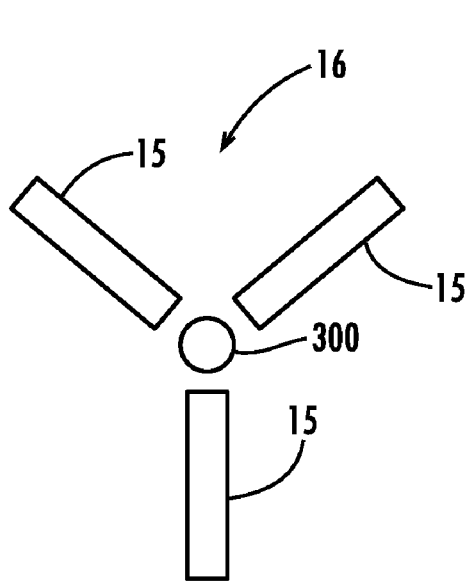
FIG. 25 is a schematic front view of an engine comprising a plurality of an odd number of OPOC engine cylinders coupled to a common crankshaft in an equally-spaced radial relationship, in accordance with an embodiment of the present invention.

FIG. 25 is a schematic front view of an engine 16 comprising a plurality of an odd number of OPOC engine cylinders 15, shown herein with three engine cylinders 15, coupled to a common crankshaft 300 in an equally-spaced radial relationship, in accordance with an embodiment of the present invention. Engines 16 of this configuration are characterized by simply coupling additional engine cylinders 15 to the common crankshaft 300 for providing additional power output. In other embodiments, additional engines 16 are coupled to the common crankshaft 300 in a parallel relationship, such as shown in FIG. 24.

Figure 26:
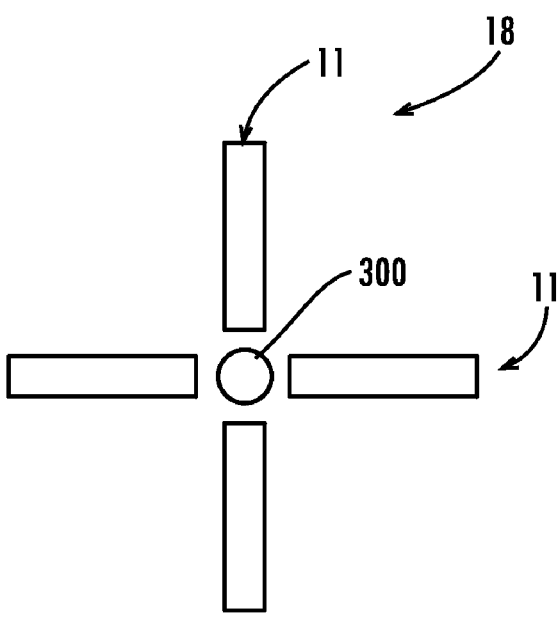
FIG. 26 is a schematic front view of an engine comprising a plurality of OPOC engines coupled to a common crankshaft in an equally-spaced radial relationship, in accordance with an embodiment of the present invention.

FIG. 26 is a schematic front view of an engine 18 comprising a plurality of OPOC engines 11, shown herein with two engines 11, coupled to a common crankshaft 300 in an equally-spaced radial relationship, in accordance with an embodiment of the present invention. Engines 18 of this configuration are characterized by simply coupling additional engines 11 to the common crankshaft 300 for providing additional power output. In other embodiments, additional engines 18 are coupled to the common crankshaft 300 in a parallel relationship, such as shown in FIG. 24.

Multi-engines, such as those shown above, provide additional power flexibility by providing a relatively simple means for decoupling one or more of the engines from the crankshaft for incremental power reduction.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

The corresponding structures, materials, acts, and equivalents of all means or step plus function elements in the claims below are intended to include any structure, material, or acts for performing the functions in combination with other claimed elements as specifically claimed.

The invention claimed is:

1. An internal combustion engine comprising:
two opposed cylinders, each cylinder comprising a housing having a cylinder cavity defining a bore and a cylinder liner slidingly received in the bore, each cylinder liner having a pair of opposing inner and outer pistons that define a combustion chamber and reciprocate on a common axis in a given cylinder;
each cylinder having an intake port and exhaust port in fluid communication with the combustion chamber such that the ports are opened or closed by the movement of the pistons in the cylinder liner; and
the cylinder liners being axially slideable within the respective bores to shift the timing of the opening and closing of the intake and/or exhaust ports for their respective cylinder.

2. The internal combustion engine of claim 1 further comprising a crankshaft disposed between the two disposed cylinders and rotatably coupled to the pistons in each cylinder.

3. The internal combustions engine of claim 2 wherein the exhaust ports for each cylinder are disposed at one end portion of the cylinders, and the intake ports are disposed at an opposite end portion of the cylinders, the crankshaft having a set of journals coupled to the pistons and arranged so that in each cylinder one piston in the cylinder opens and closes an intake port for a given cylinder, and the other piston in the same cylinder opens and closes an exhaust port for that cylinder.

4. The internal combustion engine of claim 3 wherein the arrangement of cylinder liners and ports is such that an axial shift of the cylinder liners toward the crankshaft, from a first position to a second position, effectively decreases the time in which the exhaust ports are opened by the inner pistons, and increases the time the intake ports remain opened by the outer pistons.

5. The internal combustion engine of claim 4 wherein the engine is configured to position the cylinder liners in the first position at a predetermined engine speed and in the second position an engine speed relatively lower than the predetermined engine speed.

6. The internal combustion engine of claim 1 wherein the arrangement of cylinder liners and ports is such that an axial shift of the liners toward the crankshaft from a first position to a second position effectively decreases the time in which a set of (i) intake ports or (ii) a set of exhaust ports proximate the crankshaft remain opened by a set of inner pistons and increases the time the other set of ports remain opened by a set of outer pistons.

7. The internal combustion engine of claim 1 wherein the engine is configured so that the cylinder liners are slidingly adjustable to a predetermined position in accordance with a predetermined performance parameter.

8. The internal combustion engine of claim 7 wherein the predetermined performance parameter comprises engine speed.

9. The internal combustion engine of claim 1 wherein the arrangement of cylinder liners and ports is such that an axial shift of the cylinder liners toward the crankshaft, from a first position to a second position, effectively decreases the time in which a set of (i) intake ports or (ii) a set of exhaust ports proximate the crankshaft remain opened by a set of inner pistons and increases the time the other set of ports remain opened by a set of outer pistons, and wherein the engine is configured to position the cylinder liners in the first position at a first predetermined engine speed and in a second position at a second predetermined engine speed.

10. The internal combustion engine of claim 1 wherein the cylinder liner and intake ports for a given cylinder are arranged so that the cylinder liner is axially slideable to adjust the timing of the opening and closing of the intake ports.

11. The internal combustion engine of claim 1 wherein the cylinder liner and intake ports for a given cylinder are arranged so that the cylinder liner is axially slideable to adjust the timing of the opening and closing of the exhaust ports.

12. The internal combustion engine of claim 1 wherein the cylinder liner and intake ports for a given cylinder are arranged so that the cylinder liner is axially slideable to adjust the timing of the opening and closing of both the intake ports and the exhaust ports.

13. The internal combustion engine of claim 1 further comprising an actuating means coupled to a given cylinder liner for axially adjusting the position of the liner within the bore.

14. The internal combustion engine of claim 1 further comprising an actuator coupled to a given cylinder liner for axially adjusting the position of the liner within its bore, the actuator comprising an electric motor.

15. The internal combustion engine of claim 1 further comprising an actuator coupled to a given cylinder liner for axially adjusting the position of the liner within its bore, the actuator comprising a hydraulic actuator.

16. The internal combustion engine of claim 1 further comprising an actuator coupled to a given cylinder liner for axially adjusting the position of the liner within its bore, the actuator comprising a hydraulic actuator adapted so that fluid pressure is transferable to a portion of the cylinder liner to overcome a restoring element and to change the position of the cylinder liner from a first position to a second position.

17. The internal combustion engine of claim 16 wherein the engine is adapted with a fluid channels associated with the cylinder liner to cool the liner, and the cooling fluid used in the channel communicates with the hydraulic actuator to pressurize it.

18. The internal combustion engine of claim 17 wherein the engine is configured to position the cylinder liner from a first position at a predetermined engine speed to a second position at an engine speed relatively lower than the predetermined engine speed, and the pressure of the cooling fluid to the actuator is controlled to effect changes in position.

19. The internal combustion engine of claim 1 further comprising a crankshaft linked to each inner piston by a push rod and linked to each outer piston by a pull rod, wherein rotation of the crankshaft causes asymmetric port timing so that the exhaust ports are opened by their respective inner pistons before the intake ports are opened by their respective outer pistons, and the exhaust ports are closed by their respective inner pistons before the intake ports are closed by their respective outer pistons.

20. A cylinder assembly for an internal combustion engine comprising:
a housing having a cylinder cavity defining a bore, and a cylinder liner slidingly received in the bore, the cylinder liner adapted to receive a pair of opposing inner and outer pistons that reciprocate on a common axis and define a combustion chamber within the cylinder liner;
the cylinder having an intake port and exhaust port in fluid communication with the combustion chamber such that the ports are opened or closed by the movement of the pistons in the cylinder liner; and the cylinder liner being axially slideable within the bore to shift the timing of the opening and closing of the intake and/or exhaust ports for their respective cylinder.

21. The cylinder assembly of claim 20 further comprising an actuator coupled to the cylinder liner for axially adjusting the position of the liner within the bore the shifting of the positions thereby providing variable port timing.

22. The cylinder assembly of claim 21 wherein the actuator is adapted to shift positions in response to a predetermined engine speed.

23. A method of making a cylinder assembly for an internal combustion engine comprising:

providing a housing having a cylinder cavity defining a bore, disposing cylinder liner slidingly within the bore, the cylinder liner adapted to receive a pair of opposing inner and outer pistons that reciprocate on a common axis and define a combustion chamber within the cylinder liner;

wherein the cylinder has an intake port and exhaust port in fluid communication with the combustion chamber such that the ports are opened or closed by the movement of the pistons in the cylinder liner; and configuring the assembly with a first position for the liner that is used at a predetermined first engine speed and second position that is used at a predetermined second speed, the shifting of the positions thereby providing variable port timing.

* * * * *